US012763535B2

(12) United States Patent
Holland et al.

(10) Patent No.: US 12,763,535 B2
(45) Date of Patent: Oct. 13, 2026

(54) UNINTERRUPTABLE TAP

(71) Applicant: HOLLAND ELECTRONICS LLC, Ventura, CA (US)

(72) Inventors: Michael Holland, Santa Barbara, CA (US); George Goebel, Camarillo, CA (US)

(73) Assignee: Holland Ex, Mama (CA)

( * ) Notice: Subject to any disclaimer, the term of this patent is extended or adjusted under 35 U.S.C. 154(b) by 771 days.

(21) Appl. No.: 17/984,075

(22) Filed: Nov. 9, 2022

(65) Prior Publication Data

US 2023/0078603 A1 Mar. 16, 2023

Related U.S. Application Data

(63) Continuation-in-part of application No. 17/902,804, filed on Sep. 3, 2022, now Pat. No. 12,272,908, which is a continuation-in-part of application No. 17/864,180, filed on Jul. 13, 2022, now Pat. No. 11,894,641, which is a continuation of application No. 17/479,286, filed on Sep. 20, 2021, now Pat. No. 11,611,181, which is a continuation-in-part of application No. 16/939,674, filed on Jul. 27, 2020, now Pat. No. 11,233,366, which is a continuation-in-part of application No. 16/809,064, filed on Mar. 4, 2020, now Pat. No. 11,437,694.

(51) Int. Cl.

| | |
|---|---|
| ***H01R 25/00*** | (2006.01) |
| ***H01R 13/447*** | (2006.01) |
| ***H01R 31/02*** | (2006.01) |
| ***H01R 33/76*** | (2006.01) |
| ***H01R 33/88*** | (2006.01) |
| ***H01R 33/945*** | (2006.01) |
| ***H04B 10/2575*** | (2013.01) |

(52) U.S. Cl.

CPC .......... *H01R 25/003* (2013.01); *H01R 31/02* (2013.01); *H01R 33/76* (2013.01); *H01R 33/88* (2013.01); *H01R 33/945* (2013.01); *H04B 10/25751* (2013.01); *H01R 13/447* (2013.01); *H01R 2201/18* (2013.01)

(58) Field of Classification Search

CPC ...... H01R 25/003; H01R 31/02; H01R 31/00; H01R 33/76; H01R 33/88; H01R 33/945; H01R 13/447; H01R 2201/18; H04B 10/25751; H04N 7/104

See application file for complete search history.

(56) References Cited

U.S. PATENT DOCUMENTS

| | | | | |
|---|---|---|---|---|
| 5,058,198 | A * | 10/1991 | Rocci | H03H 7/482 333/132 |
| 5,909,154 | A * | 6/1999 | Brown | H04N 7/104 333/100 |
| H1858 | H * | 9/2000 | Ibelings | H04N 7/10 348/12 |
| 6,133,939 | A | 10/2000 | Gresko et al. | |
| 6,570,465 | B2 | 5/2003 | Tang | |
| 2009/0133095 | A1 * | 5/2009 | Phillips | H03H 7/482 725/149 |

(Continued)

*Primary Examiner* — Andrea Lindgren Baltzell
*Assistant Examiner* — Kimberly E Glenn
(74) *Attorney, Agent, or Firm* — Paul D Chancellor; Ocean Law

(57) ABSTRACT

A coaxial tap in a hybrid fiber coaxial cable distribution system serves subscribers with an RF signal.

15 Claims, 33 Drawing Sheets

(56) References Cited

U.S. PATENT DOCUMENTS

| | | | | |
|---|---|---|---|---|
| 2019/0166406 | A1* | 5/2019 | Stetson, Jr. | H04N 7/104 |
| 2019/0207332 | A1 | 7/2019 | Jones et al. | |
| 2020/0036938 | A1 | 1/2020 | Jones et al. | |
| 2021/0036795 | A1* | 2/2021 | Krivokapic | H04L 49/201 |

* cited by examiner

1200E

| Switch Position | RF Signal |
|---|---|
| Open (Mated housing and cover) | RF Passed To Directional Coupler and Splitter |
| Closed (Separated housing and cover) | RF Bypasses Directional Coupler and Splitter |

1300E

| Switch Position | RF Signal |
|---|---|
| Open (Directional coupler plugged in or mated housing and cover) | RF Passed To Directional Coupler and Splitter |
| Closed (Directional coupler not plugged in or separated housing and cover) | RF Bypasses Directional Coupler and Splitter |

UNINTERRUPTABLE TAP

PRIORITY AND INCORPORATION BY REFERENCE

This application is a continuation-in-part of U.S. patent application Ser. No. 17/902,804 entitled Uninterruptable Tap, filed Sep. 3, 2022 which is a continuation-in-part of U.S. patent application Ser. No. 17/864,180 entitled Uninterruptable Tap, filed Jul. 13, 2022 which is a continuation of U.S. patent application Ser. No. 17/479,286 entitled Uninterruptable Tap, filed Sep. 20, 2021 which is a continuation-in-part of U.S. patent application Ser. No. 16/939,674 (now U.S. Pat. No. 11,233,366) entitled Uninterruptable Tap, filed Jul. 27, 2020 which is a continuation-in-part of U.S. patent application Ser. No. 16/809,064 entitled Uninterruptable Tap, filed Mar. 4, 2020. Each of U.S. patent application Ser. No. 17/479,286, U.S. patent application Ser. No. 16/939,674, and U.S. patent application Ser. No. 16/809,064 is incorporated herein by reference for all purposes.

BACKGROUND OF THE INVENTION

Field of the Invention

The present invention relates generally to an article of manufacture for exchanging electrical signals. In particular, a coaxial tap shares signals between coaxial circuits such as between a hardline coaxial circuit and a subscriber coaxial circuit.

Discussion of the Related Art

Coaxial taps serve subscribers by exchanging signals between a distribution circuit and subscriber circuit(s). They are commonly used in hybrid fiber coaxial (HFC) distribution systems, for example systems providing cable television (CATV) services and/or Internet services. In a typical HFC system, there are multiple coaxial taps along a coaxial distribution line such as a coaxial hardline. The hardline coaxial cable distributes a signal which includes an RF signal and an equipment supply voltage. The distributed RF signal is shared with subscribers served by each tap and the equipment supply voltage powers devices connected to the distribution circuit.

SUMMARY OF THE INVENTION

The evolution of HFC systems includes increases in data transmission speeds. For example, 1.2 GHz (Gigahertz) systems will in cases be upgraded to 2-3 GHz systems. This evolution may require various modification in equipment including HFC taps.

For example, in order to increase the bandwidth of a CATV distribution system, outside signal distribution taps may require an upgrade to a frequency of 1.8 GHz or more. In some cases, a completely new tap may be installed. In other cases, the existing case or housing connected to the hardline coaxial cable may remain. It has been found that unscrewing a hardline connector from an existing tap and then screwing it back into a new tap has limitations. If there is not enough slack in the connected hardlines to replace the existing connector with a new one, then the existing case or housing must remain. Where the existing tap includes a housing connected to the hardline coaxial cables and a cover that mates with the housing, various changes may be required. For example, mechanical and electrical components or assemblies in the tap housing may be replaced. For example, a printed circuit board attached to the cover may be replaced or both the board and the cover may be replaced.

In an embodiment, a tap for use in a cable television distribution system comprises: a tap housing with coaxial cable ports configured to interconnect with an upstream hardline and a downstream hardline; the hardlines configured to transport cable television signals that are RF signals and equipment supply voltage; the housing enclosing hardline circuits and drop circuits; and, the drop circuits for servicing subscriber ports; wherein tap hardline circuits are configured to continuously pass an equipment supply voltage present on one of the hardlines to the other of the hardlines irrespective of whether RF signals are conveyed to the subscriber ports.

In an embodiment, a tap for use in a cable television distribution system comprises: a tap housing with coaxial cable ports configured to interconnect with an upstream hardline and a downstream hardline; the hardlines configured to transporting cable television signals that are RF signals and equipment supply voltage; the housing enclosing hardline circuits and drop circuits; and, the drop circuits for servicing subscriber ports; wherein an RF switch for passing only RF signals is configured to pass RF signals present on one of the hardlines to the other of the hardlines when circuits for conveying the RF signal to the subscriber ports cease to convey the RF signal to the subscriber ports.

In an embodiment a tap for use in a cable television distribution system comprises: a tap housing with coaxial cable ports configured to interconnect with an upstream hardline and a downstream hardline; the hardlines configured to transport cable television signals that are RF signals and equipment supply voltage; and, the housing enclosing circuits configured to convey the RF signals to subscriber ports and configured to pass RF signals and the equipment supply voltage between the upstream hardline and the downstream hardlines; wherein a bridge is configured to continuously pass equipment supply voltage but not RF signals between the upstream and downstream hardlines and an RF switch is configured to pass RF signals but not equipment supply voltage between the upstream and downstream hardlines when the RF signals do not reach the subscriber ports.

In an embodiment, a tap for use in a cable television distribution system comprises: a tap housing with coaxial cable ports configured to interconnect with an upstream hardline and a downstream hardline; the hardlines transporting cable television signals that are RF signals and equipment supply voltage; the housing enclosing hardline circuits and drop circuits; the drop circuits for servicing subscriber ports; and, the hardline circuits including a bridge for continuously passing equipment supply voltage but not RF signals between the upstream and downstream hardlines; wherein an RF switch is for passing RF signals but not equipment supply voltage between the upstream and downstream hardlines when the drop circuits do not receive the RF signals.

In an embodiment a tap for use in a cable television distribution system comprises a tap housing with coaxial cable ports configured to interconnect with an upstream hardline and a downstream hardline; the tap housing having an exterior surface that includes plural subscriber connections; within the tap housing, circuits configured to convey the RF signals to subscriber ports and configured to pass RF signals and the equipment supply voltage between the upstream hardline and the downstream hardline; within the tap housing, a socket interconnected with the circuits; the socket configured to removably receive an electronic module; the electronic module including a directional coupler or a signal conditioner or both a directional coupler and a signal conditioner; an entryway in the exterior surface that provides access to the socket and a passage for the electronic module; and, a removable closure for blocking the entryway.

The tap above wherein tap internals are accessible only by the entryway in the exterior surface.

In an embodiment, a tap for use in a cable television distribution system comprises: a tap housing with a front face opposite a back face and sidewalls joining the faces; coaxial cable hardline ports configured to interconnect with an upstream hardline and a downstream hardline; subscriber ports located on the front face and configured to interconnect with subscribers; within the tap housing, circuits configured to convey the RF signals to subscriber ports and configured to pass RF signals and the equipment supply voltage between the upstream hardline and the downstream hardline; within the tap housing one or more sockets interconnected with the circuits; the one or more sockets configured to removably receive respective electronic modules, each module including a directional coupler or a signal conditioner or both a directional coupler and a signal conditioner; for each socket, an opening in the face plate or sidewalls that is aligned with the socket; and, a removable closure for blocking each of the openings; wherein each opening corresponds in size with the electronic module associated with the socket aligned with the opening such that the electronic module may be passed through the opening.

In the above embodiment wherein but for the one or more openings, the tap is permanently sealed.

In an embodiment, a tap for use in a cable television distribution system comprises: a tap housing with a front face opposite a back face and sidewalls joining the faces; tap housing coaxial cable ports configured to interconnect with an upstream hardline and a downstream hardline; the tap housing front face having plural subscriber connections; within the tap housing, circuits configured to convey the RF signals to subscriber ports and configured to pass RF signals and the equipment supply voltage between the upstream hardline and the downstream hardline; within the tap housing, a socket interconnected with the circuits; the socket configured to removably receive an electronic module; the electronic module including a directional coupler or a signal conditioner or both a directional coupler and a signal conditioner; a tap housing entryway that provides access to the socket and a passage for insertion or removal of the electronic module from the tap housing; and, a removable closure for blocking the entryway.

The embodiment above wherein the entryway corresponds in size with the associated electronic module such that the electronic module may be passed through the opening.

In an embodiment, the invention provides a device for exchanging signals between a distribution circuit and one or more subscriber circuits. In an embodiment, a tap is for use in a hybrid fiber coaxial (HFC) cable distribution system, the tap comprising: a metallic housing for interconnection with an upstream hardline and a downstream hardline; the hardlines transporting RF signals and equipment supply voltage signals; the housing enclosing hardline circuits and drop circuits; the drop circuits for servicing subscriber ports; the hardline circuits including a bridge for passing only low frequency equipment supply voltage signals between the upstream and downstream hardlines; and, the drop circuits for passing only high frequency signals between the upstream and downstream hardlines; wherein an RF switch is for passing only RF signals between the upstream and downstream hardlines when the drop circuits are disconnected from the hardline circuits.

In an embodiment a tap is for use in a hybrid fiber coaxial (HFC) cable distribution system, the tap comprising: a metallic housing for interconnection with an upstream hardline and a downstream hardline; the housing enclosing hardline circuits and drop circuits; the drop circuits servicing subscriber ports; the hardline circuits including a bridge for separating RF signals and equipment supply voltage signals; the separated equipment supply voltage signals transferred from one of the hardlines to the other hardline; the separated RF signals transferred to the drop circuits and back to the bridge when an RF switch status indicates the drop circuits are connected to the hardline circuits; and, the separated RF signals bypassing the drop circuits and transferred back to the bridge when switch status indicates that the drop circuits are not connected to the hardline circuits.

In some embodiments the tap further comprises an RF switch actuator; and, the actuator moving in response to movement of the drop circuits with respect to the hardline circuits. In some embodiments the tap further comprises connectors for electrically connecting the drop circuits and the hardline circuits; the RF switch in a first state when the connectors are mated; and, the RF switch in a second state when the connectors are not mated. In some embodiments the tap further comprises connectors for electrically connecting the drop circuits and the hardline circuits; and, wherein moving the drop circuits away from the hardline circuits in a direction that disconnects the drop circuits from the hardline circuits changes the state of the RF switch. In some embodiments moving the drop circuits toward the hardline circuits in a direction that connects the drop circuits and the hardline circuits changes the state of the RF switch. In some embodiments the drop circuits pass RF signals when the RF switch is open. In some embodiments the drop circuits do not pass RF signals when the RF switch is closed. In some embodiments the RF switch employs a single contact for closing a circuit between connectors used to interconnect the drop circuits and the hardline circuits. In some embodiments the RF switch employs plural contacts for closing a circuit between connectors used to interconnect the drop circuits and the hardline circuits.

In some embodiments first and second connectors are used to interconnect the drop circuits and the hardline circuits; an RF switch in a circuit between the first and second connectors; the bridge including a first diplexer and a second diplexer; the first diplexer coupled to the upstream hardline, the first connector, and the second diplexer; and, the second diplexer coupled to the second connector and the downstream hardline. In some embodiments RF signals originating at the headend are separated into RF signals and equipment supply voltage signals at the first diplexer and at the second diplexer RF signals transported by the RF switch circuit or drop circuits are recombined with equipment supply voltage signals transported by the bridge. In some embodiments subscriber RF signals that originate from a subscriber using this tap or in a tap downstream of this tap are transported to the headend via the first diplexer.

In an embodiment a tap is for use in a hybrid fiber coaxial (HFC) cable distribution system, the tap comprising: a metallic housing for interconnection with an upstream hardline and a downstream hardline; the housing enclosing hardline circuits and drop circuits; the drop circuits including a splitter and a directional coupler; the drop circuits servicing subscriber ports; the hardline circuits including a bridge for separating RF signals and equipment supply voltage signals; the separated equipment supply voltage signals transferred from one of the hardlines to the other hardline; an RF switch and an RF switch state allowing transport of the separated RF signals to the drop circuits and back to the bridge; and, an RF switch state allowing transport of the separated RF signals back to the bridge independent of the drop circuits.

In this patent application, various embodiments may substitute any form of a hybrid transformer or hybrid passive transformer for a splitter. In this patent application, various embodiments may substitute any form of a hybrid transformer or hybrid passive transformer for a directional coupler.

In some embodiments, connectors are for interconnecting the directional coupler with the drop circuits; and, the directional coupler separable from the tap when connectors are separated. In some embodiments the tap further comprises: a penetration in the housing; and, the penetration exposing the directional coupler. In some embodiments the tap further comprises a metallic closure for covering the penetration and shielding tap internals from ingress or egress of RF signals via the penetration. In some embodiments removal of the metallic closure allows the directional coupler to be exchanged with, due to the bridge, no interruption of downstream equipment supply voltage and with, due to the RF switch, substantially no interruption of downstream RF service. In some embodiments the tap further comprises: a wire clamp extending from the housing; and, the wire clamp on a housing surface opposite or facing the face plate. In some embodiments the tap further comprises: a wire clamp extending from the housing; and, the wire clamp on a housing surface adjoining the face plate.

In various embodiments, the RF-only switch is a single pole, single throw, RF-only switch. In some embodiments the RF-only switch utilizes a bridging conductor that moves to connect with or disconnect from two other conductors.

This summary may not identify all features of various embodiments of the claimed subject matter. The general description provided by the foregoing and the detailed description which follows are exemplary and indicate an overview or framework useful in understanding the nature and character of the disclosure.

BRIEF DESCRIPTION OF THE DRAWINGS

Description of the present invention is aided by reference to the accompanying exemplary figures. These figures, incorporated herein and forming part of the specification, illustrate selected embodiments of the invention and, together with the description, further serve to explain its principles enabling a person skilled in the relevant art to make and use the invention.

DESCRIPTION OF VARIOUS EMBODIMENTS

The disclosure provided herein describes examples of some embodiments of the invention. The designs, figures, and descriptions are non-limiting examples of the embodiments they disclose. For example, other embodiments of the disclosed device and/or method may or may not include the features described herein. Moreover, disclosed advantages and benefits may apply to only certain embodiments of the invention and should not be used to limit the disclosed invention.

Where conductors carrying RF signals are mentioned below, any one or more of these conductors may be shielded. Where filters intended to filter signals of particular frequencies are mentioned, any filter suited to filtering the particular frequencies may be used.

Figure 1:
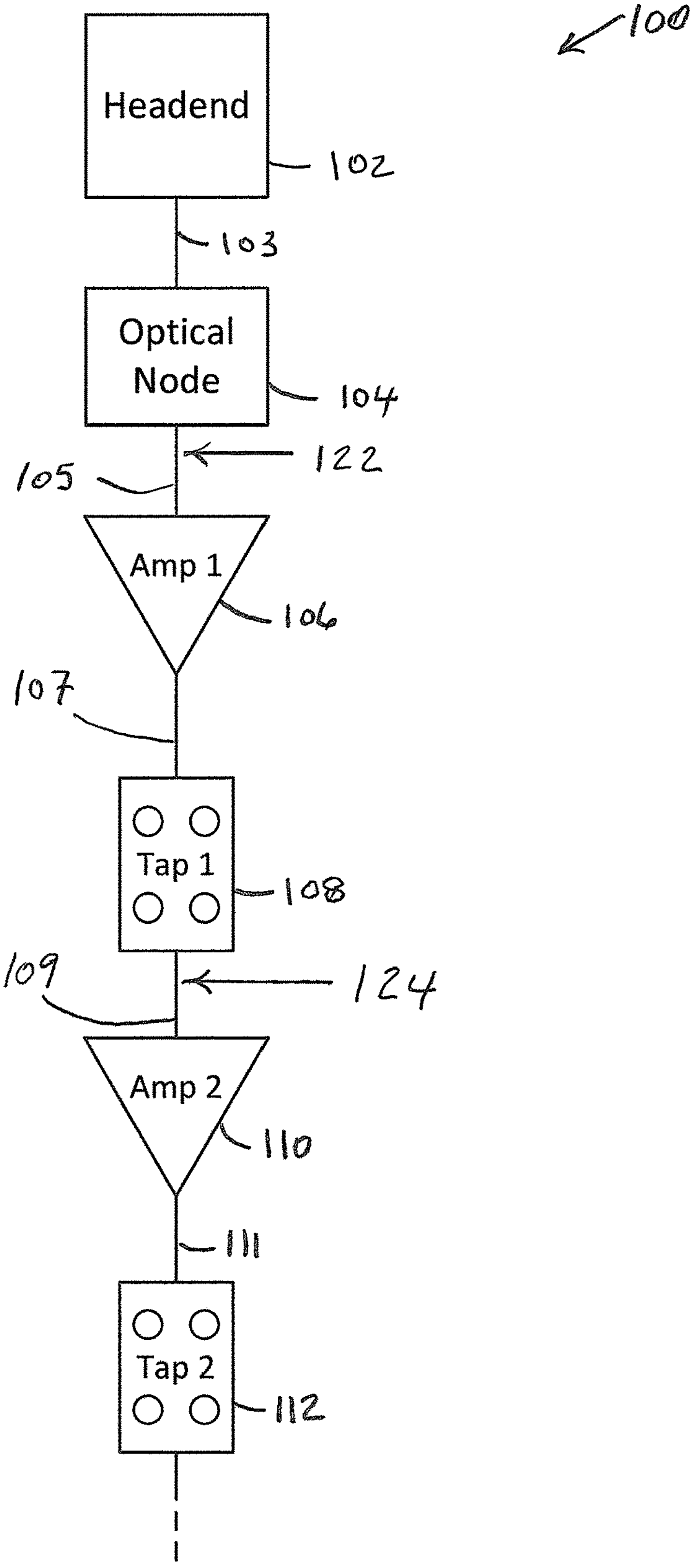
FIG. 1 shows a hybrid fiber coaxial cable distribution plant.
Figure 2A:
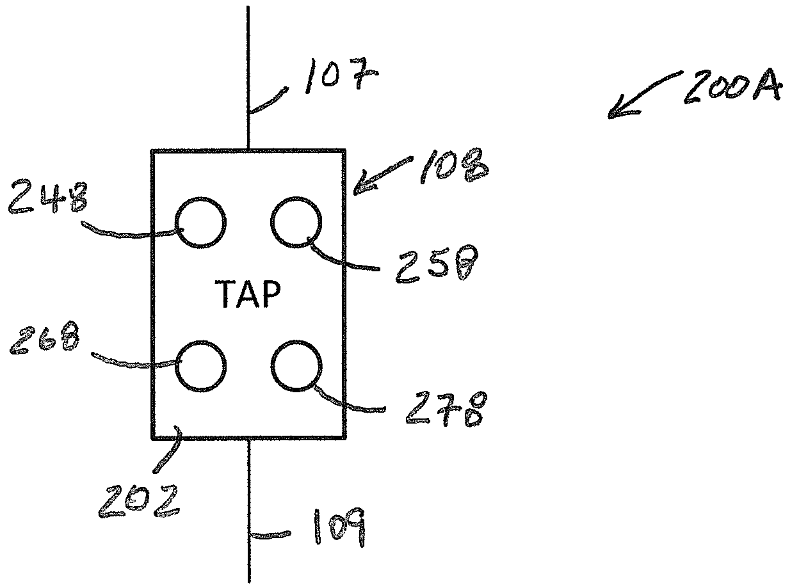
FIGS. 2A-B show front and side views of a tap in accordance with embodiments of the present invention.
Figure 2B:
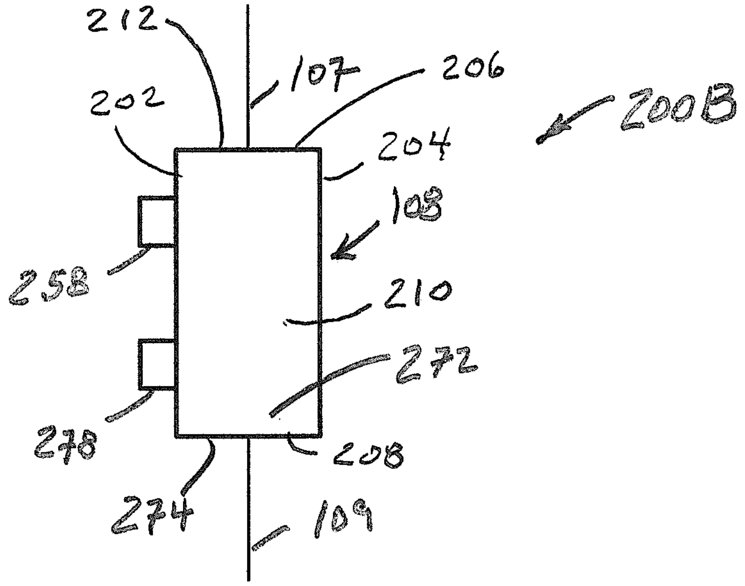

FIGS. 1, 2A, 2B are schematics of a hybrid fiber cable (HFC) signal distribution system and a tap used with this system 100, 200A, 200B.

FIG. 1 shows a hybrid fiber coaxial (HFC) cable distribution system 100 such as may be used for distributing television services and/or internet services. The cable distribution system includes a headend 102 interconnected to an optical node 104 via optical fiber 103.

The optical node 104 is connected to downstream coaxial devices via coaxial cables. In the example shown, a headend 102 is connected with an optical node 104 via an optical fiber 103. Thereafter, each of the optical node 104, amplifier 1 106, tap 1 108, amplifier 2 110, and tap 2 112 are interconnected by respective coaxial cables 105, 107, 109, 111. While RF signals may originate at the headend, equipment supply voltage (or power) signals may originate at various locations, e.g. 122, 124, along the coaxial cables.

FIG. 2A shows a tap front view 200A. In this example, a tap face plate 202 includes four subscriber ports or drops such as F Type ports 248, 258, 268, 278. Notably, the number of subscriber ports may vary, for example 2, 4, 6, 8, or 10 subscriber ports may be associated with a tap. Interconnecting with the tap, a hardline coaxial cable 107 is shown upstream of the tap and a hardline coaxial cable 109 is shown downstream of the tap.

FIG. 2B shows a tap side view 200B. In this example, F Type ports 258 and 278 are seen projecting from the face plate 202. A tap internal space 272 is bounded by the face plate and by an attached enclosure or enclosure assembly 274 that receives the coaxial cables 107, 109. In various embodiments, the tap internal space 272 is completely enclosed, for example by the tap face plate 202 and the abutting enclosure 274. Together, the face plate and the enclosure assembly may be referred to as a tap assembly 275.

FIGS. 3A-D show schematics of various tap embodiments 300A, 300B, 300C, 300D. In various embodiments, hardline cables 107, 109 carry both a high frequency RF signal and a low frequency equipment supply voltage signal. This equipment supply voltage may be up to 120 V AC or DC and the related current may be up to 15 amps.

Figure 3A:
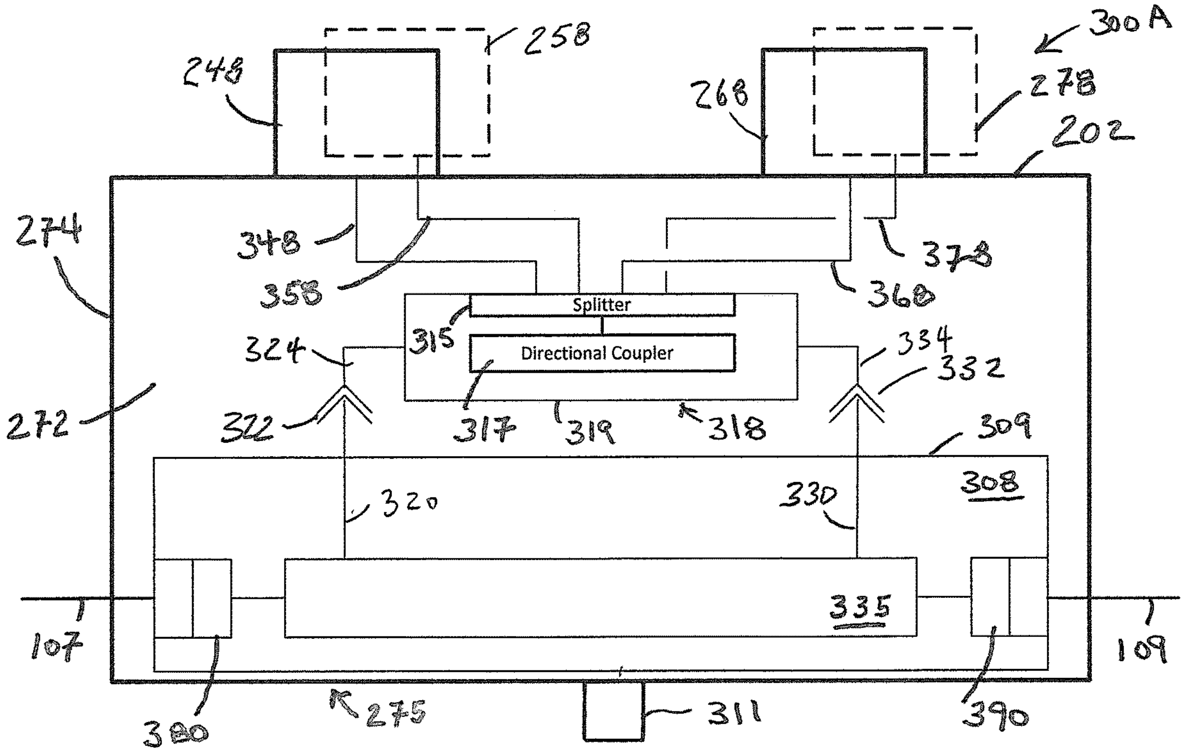
FIG. 3A shows tap internals within a housing in accordance with embodiments of the present invention.

FIG. 3A shows an exemplary tap with tap circuits within a tap enclosure 300A. The tap circuits include port or drop circuits 318 and coaxial trunk line or hardline circuits 308. Drop circuit connection lines 348, 358, 368, 378 interconnect with drop ports 248, 258, 268, 278. The hardline circuits 308 interconnect with the hardlines 107, 109 via external hardline connectors 380, 390. The hardline circuits 308 interconnect with the drop circuits 318 via connector 322 joining lines 320 and 324 and connector 332 joining lines 330 and 334. In various embodiments, the tap internal circuits are shielded, for example by the tap enclosure, from ingress or egress of RF signals.

In various embodiments, a case or plate 309 holding hardline circuits 308 may provide containment, substrates, and/or shielding. In various embodiments, a case or plate 319 holding drop circuits 318 may provide containment, substrates, and/or shielding.

In various embodiments, the drop circuits 318 include a directional coupler 317 interconnecting the hardline circuits 308 and a splitter 315. Here the splitter interconnects with the F ports 248, 258, 268, 278 via respective connection lines 348, 358, 368, 378. In some embodiments, the directional coupler 317 interconnects with lines 320, 330 from the hardline circuits.

In various embodiments, the drop circuits 318 are separable from the hardline circuits 308 via connectors 322, 332 interconnecting the drop circuits and a hardline bridge ("bridge") 335 of the hardline circuits 308. As mentioned, the hardline circuits are interconnected with upstream hardline 107 and with downstream hardline 109 via connectors 380, 390.

The tap 300A may be suspended from a wire such as a taut guy wire. Here, a wire clamp 311 affixed to the enclosure 274 provides a means for attaching the tap to the wire. In various embodiments, the clamp may be attached to or may be a part of any surface of the enclosure. For example, the clamp may be attached to or may be a part of the face plate 202, a surface opposite the face plate 204, or a surface adjoining the face plate 206, 208, 210, 212 (see FIG. 2B).

Figure 3B:
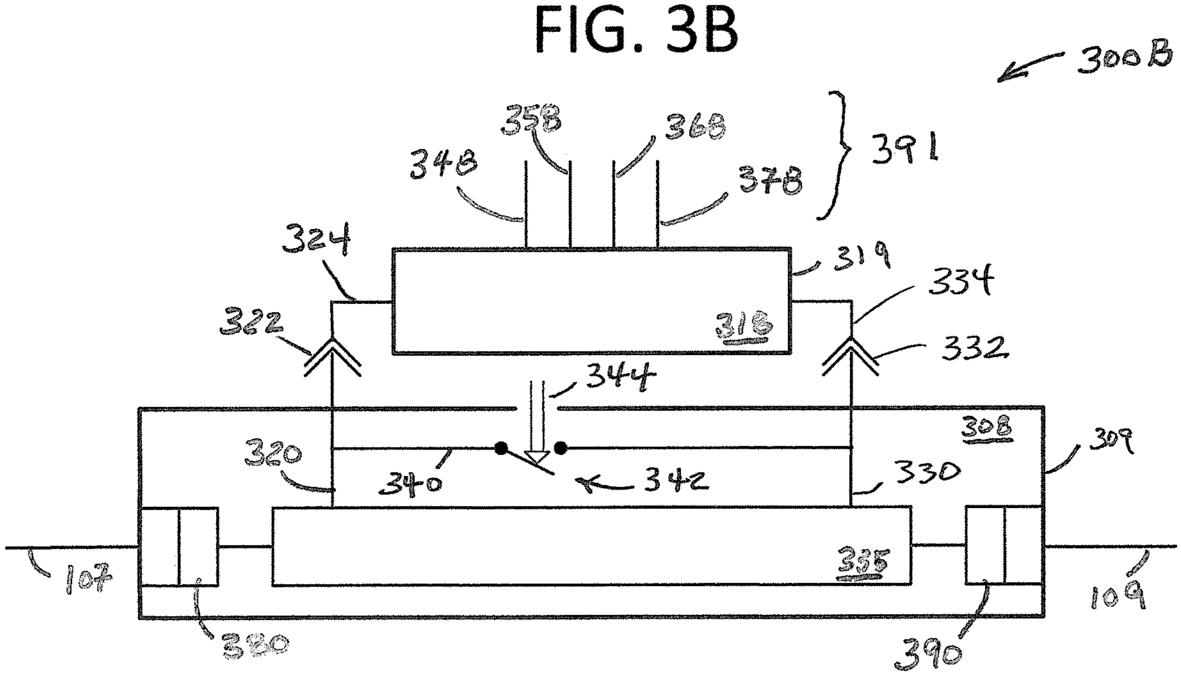
FIG. 3B shows tap internals with a single contact switch in accordance with embodiments of the present invention.

FIG. 3B shows tap circuits and a switch for bypassing the drop circuits 300B. The bypass switch is in a line 340 between bridge connections 320, 330 which interconnect the bridge to the drop circuits via the connectors 322, 332.

The internal connector(s) 322 (connecting bridge line 320 and drop circuits line 324) and 332 (connecting lines bridge 330 and port circuit line 334) interconnect the bridge 335 with the drop circuits 318. In the case that connectors 322 and 332 are separated, the drop circuits 318 are disconnected from the hardline circuits 308.

In various embodiments, separating the connectors 322, 332 changes the state of the bypass switch 342. For example, separation may cause the bypass switch 342 which was open before separation (as shown in FIG. 3B) to be closed after separation. Here, the closed switch bypasses the bridge 335. For example, when the drop circuits 318 are disconnected, the bypass path 340 through switch 342 enables passage of RF around the bridge.

Switch operation may be via an actuator 344. The actuator may be movable with the drop circuits 318 and/or with a movable/removable part of the tap assembly 300A such as the face plate 202. The actuator may be movable with respect to hardline circuits 308.

Figure 3C:
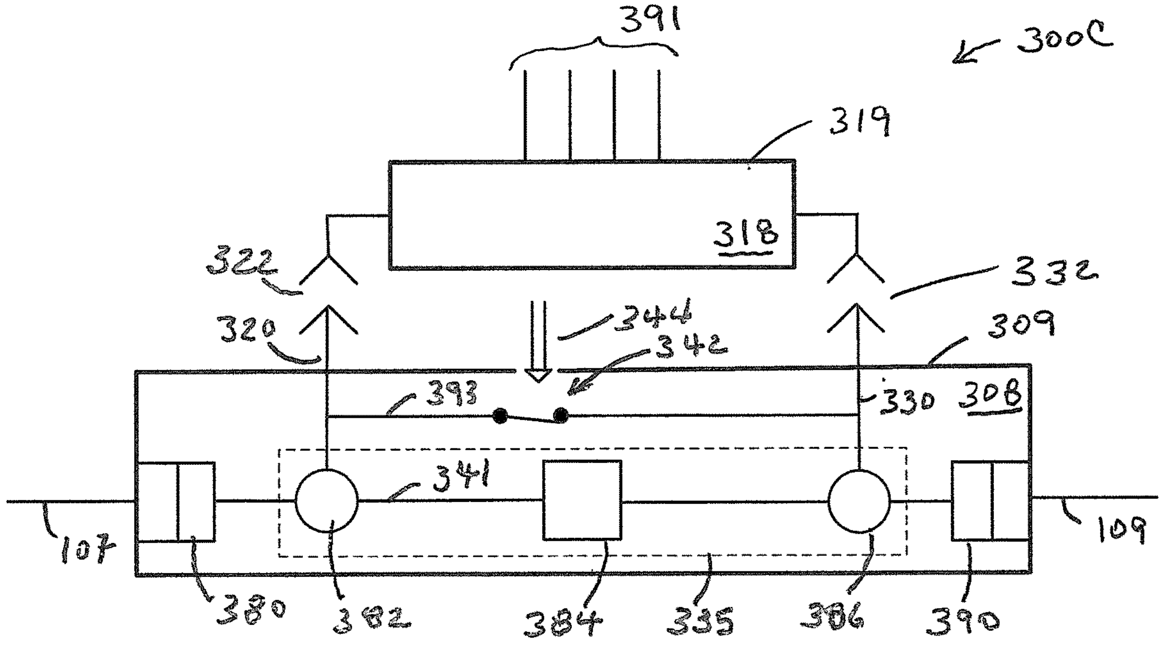
FIG. 3C shows tap internals with diplexer signal separation in accordance with embodiments of the present invention.

FIG. 3C shows another embodiment with drop circuits 318, hardline circuits 308, and details of an exemplary bridge 300C.

When switch 342 is open, RF signals pass through the drop circuit 318. For example, actuator 344 may open the switch 342. In various embodiments, the bridge includes a frequency separation device such as a diplexer 382 interconnecting with hardline 107 to separate the high and low frequency signals.

For example, the diplexer 382 may exchange signals with the hardline 107 and pass high frequency RF signals on a drop circuit line 320. Low frequency equipment supply voltage may be passed on a line 341 between hardline connectors 380, 390. Notably, where suitable, the term exchange may refer to any of the signals flowing from device A to device B, to signals flowing from device B to device A, and to signals flowing in both directions.

A second diplexer may be located downstream of the first. For example, a second diplexer 386 may recombine the low frequency equipment supply voltage signal on line 341 with a high frequency RF signal on line 330 such that the signal at the hardline connection 107 is reproduced at hardline connection 109. The signal at hardline connection 107 may be attenuated by the tap.

In some embodiments, low pass filtering 384 such as an inductive (L) or inductive-capacitive (LC) filter may be interposed in line 341, for example between the diplexers 382, 386. This low pass filtering may attenuate RF signals that would otherwise be passed between the diplexers. In some embodiments, band pass filtering may be used.

When switch 342 is closed RF signals 320, 330 leaving one of the diplexers 382, 386 are passed to the other of the diplexers. For example, when the drop circuits 318 are disconnected from the hardline circuits 308 at connectors 322, 332, the actuator 344 may move to close the switch which allows passage of RF signals along line 393 interconnecting the diplexers.

Again, the diplexer 386 may recombine the low frequency equipment supply voltage signal on line 341 with the high frequency RF signal on line 330 such that the signal at the hardline connection 107 is reproduced at hardline connection 109.

As skilled artisans will appreciate, the bridge 335 enables the equipment supply voltage to be passed from hardline connector 380 to hardline connector 390. This is the case irrespective of a connection (e.g., 322, 332) between the drop circuits 318 and the hardline circuits 308.

And, because equipment supply voltage is passed via the bridge 335, only RF signals reach the switch 342. This enables the switch to be designed to pass RF signals in particular. There is no need for the switch to pass high voltages and/or high currents to power equipment (e.g., amplifiers shown in FIG. 1) connected to the hardline coaxial cable. This is unlike current HFC taps which typically require a bypass switch that handles both RF and equipment supply voltage.

Because switch 342 is an RF switch, it can be smaller, for example due to the reduced contact area required to carry only RF signals. Switch insertion loss can also be managed/reduced as smaller switch parts allow for designs that more closely match the desired and actual switch impedance (e.g. 75 ohms) reducing undesirable reflections that retard data rates and cause signal loss. Notably, the RF switch here and elsewhere may be a mechanical switch such as a switch with contacts or an electronic switch, for example a semiconductor switch or a switch utilizing a pin diode.

It should be noted that, like the RF switch 342, the drop circuit connectors 322, 332 can also be smaller, for example due to the reduced contact area required to carry only RF signals. In cases, connector insertion loss can also be managed/reduced as smaller parts allow for designs that more closely match the desired and actual connector impedance (e.g. 75 ohms) reducing undesirable reflections that retard data rates and cause signal loss.

Figure 3D:
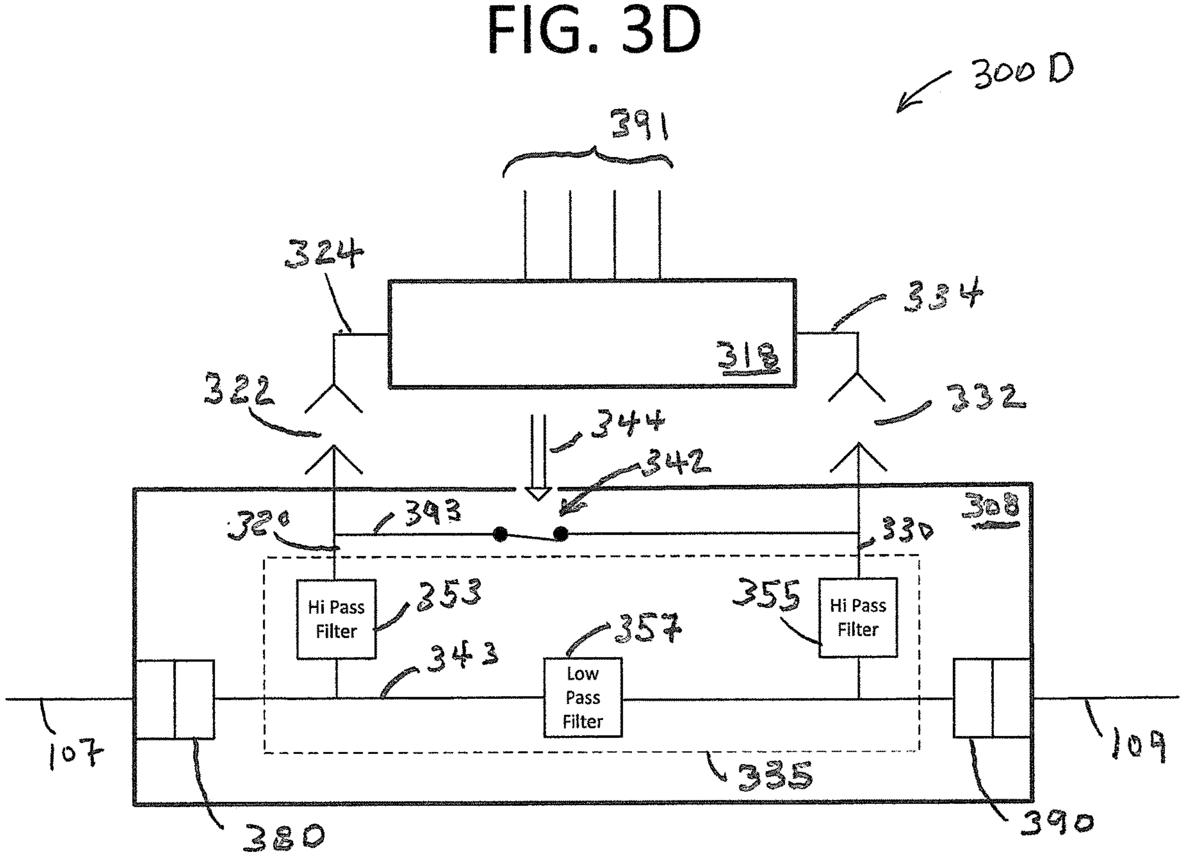
FIGS. 3D-E show tap internals with high pass filter and low pass filter signal separation in accordance with embodiments of the present invention.

FIG. 3D shows another embodiment with drop circuits 318, hardline circuits 308, and details of another exemplary bridge 300D.

In this embodiment filters are used to isolate the high frequency RF signals and the low frequency equipment supply voltage signals. As seen, the bridge 335 includes a line 343 with a low pass filter 357 that connects the upstream hardline 107 and the downstream hardline 109. To either side of the low pass filter, high pass filters 353, 355 are in lines 320, 330 that join connectors 322, 332. In some embodiments filters 353, 355 may be band pass filters.

When the drop circuits 318 are connected 322, 332 to the hardline circuits 308, switch 342 is open (not shown). High frequency RF signals from the hardline 107 are passed to the drop circuits 318 by the high pass filter 353. RF signals leaving the drop circuits pass through the high pass filter 355 and merge with the low frequency signals leaving the low pass filter 357 to reconstruct the upstream hardline signal 107.

RF signals traveling in the opposite direction, from the downstream hardline 109 to the upstream hardline 107, are transported in a similar manner via high pass filter 355 and drop circuits 318.

When the drop circuits are disconnected 322, 332 from the hardline circuits 308, switch 342 is closed (as shown). In this case, the RF signals leaving high pass filter 353 are transported via a bypass line 393 to high pass filter 355 where they are merged with the low frequency signals leaving the low pass filter 357 to reconstruct the upstream hardline signal 107.

RF signals traveling in the opposite direction, from the downstream hardline 109 to the upstream hardline 107, are transported in a similar manner via high pass filter 355 and closed switch 342.

As seen, this arrangement provides for continuous passage of low frequency signals via the bridge 335 and switching 342 of RF signals such that they pass through the drop circuits 318 (switch open) or are shunted around the drop circuits (switch closed).

Figure 3E:
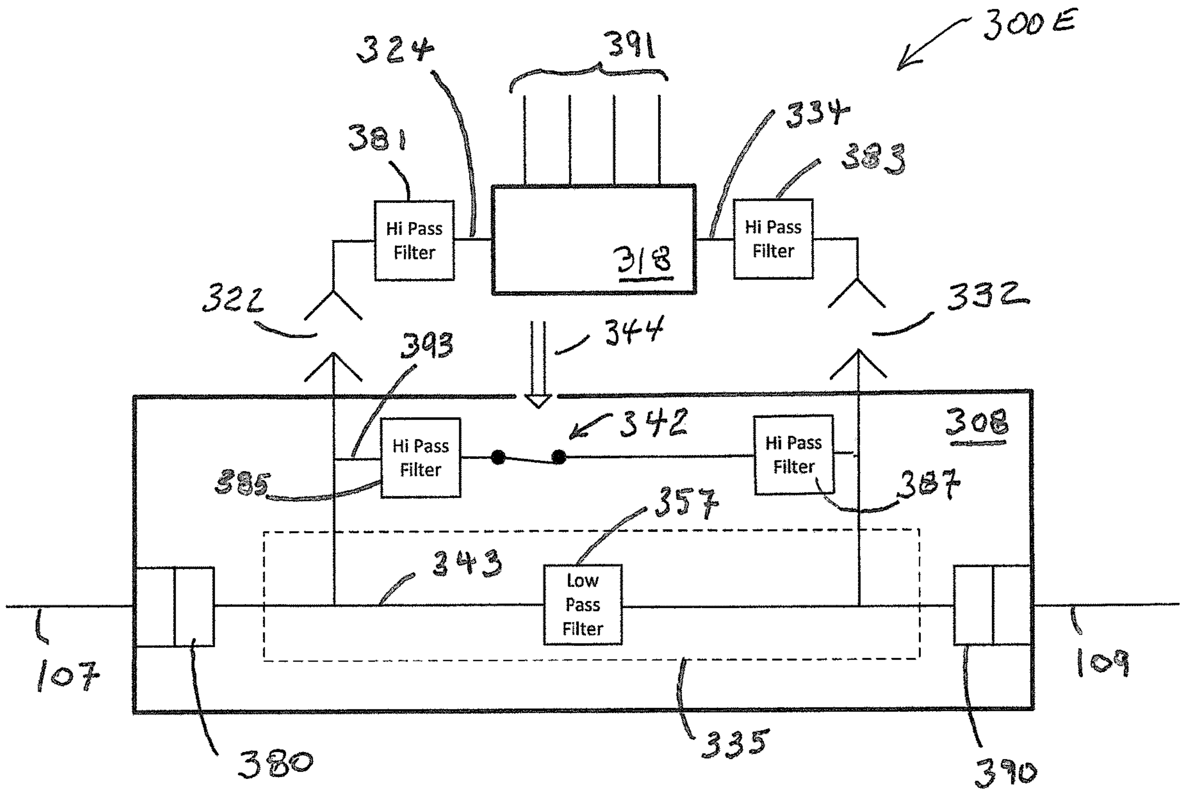

FIG. 3E shows another embodiment with drop circuits 318, hardline circuits 308, and details of an exemplary bridge 300E.

Similar to FIG. 3D, in this embodiment filters are used to isolate the high frequency RF signals and the low frequency equipment supply voltage signals. As seen, the bridge 335 includes a line 343 with a low pass filter 357 that connects the upstream hardline 107 and the downstream hardline 109.

High pass filters 385, 387 around RF switch 342 in bypass circuit 393 isolate signals such that only RF signals pass through the switch. Note that either of the high pass filters 385, 387 may be optional. The high pass filters 381, 383 may be included in the drop circuits 318 or external to the drop circuits. Drop circuits 318 are similarly isolated by high pass filters 381, 383 in lines 324, 334 entering/leaving the drop circuits.

Figure 4A:
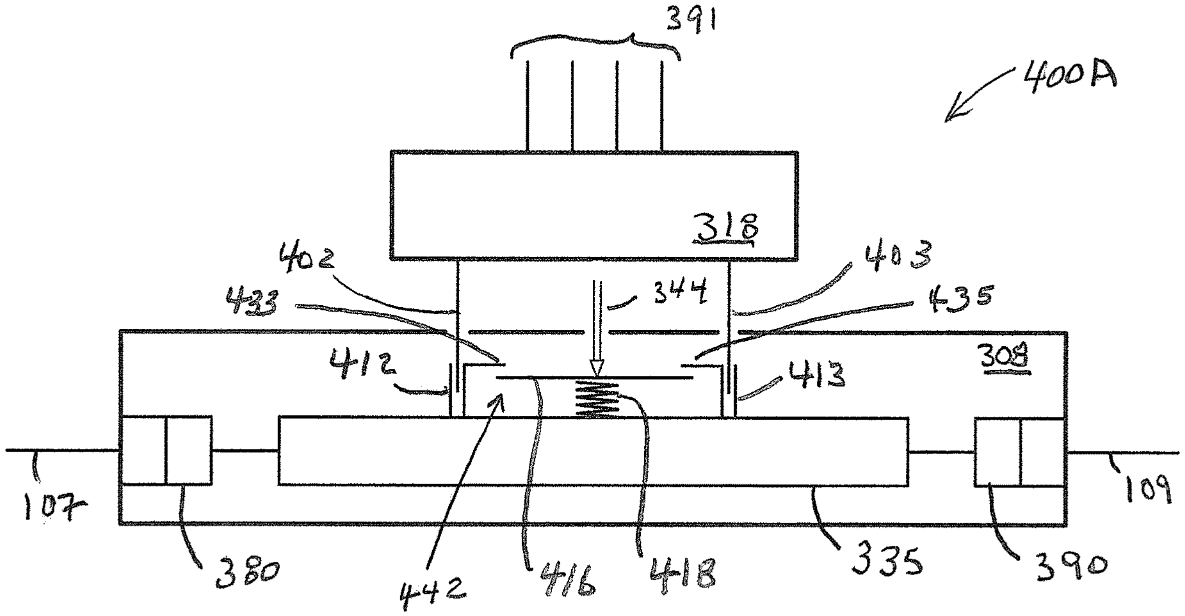
FIG. 4A-B show a tap internals with a multicontact switch in accordance with embodiments of the present invention.
Figure 4B:
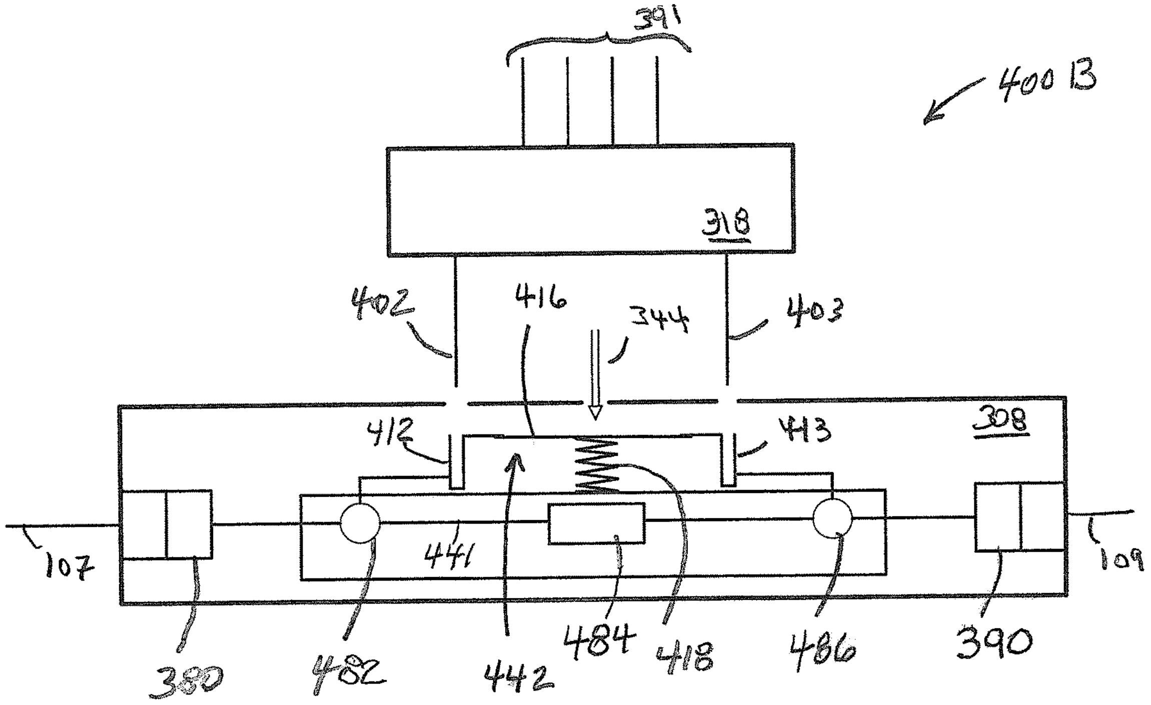

FIGS. 4A-B show tap circuits and two switch contacts for bypassing the drop circuits 400A, 400B. In various embodiments, hardline cables 107, 109 carry both a high frequency RF signal and a low frequency equipment supply voltage signal. This equipment supply voltage may be up to 120 V AC or DC and the related current may be up to 15 amps.

FIG. 4A shows tap circuits 400A. The tap circuits include drop circuits 318 and hardline circuits 308. The drop circuits interconnect 391 with subscriber ports (not shown). The hardline circuits interconnect the upstream hardline 107 and downstream hardline 109 via hardline connectors 380, 390. Internal connectors 412, 413 connect the hardline circuits 308 with the drop circuits 318.

As seen, conductors 402, 403 of the drop circuits 318 selectively connect or disconnect with mating bridge conductors 412, 413 to connect or disconnect the drop circuits from the hardline circuits 308. When connected (as shown), an actuator 344 presses a spring biased 418 conductor 416 away from the mating bridge conductors to open a circuit therebetween. When disconnected (see FIG. 4B), the actuator 344 releases the spring biased conductor which moves to contact the mating bridge conductors 433, 435 to close a circuit therebetween. As mentioned above, switch 442 may be an RF switch.

FIG. 4B includes details of an exemplary bridge 400B.

When the drop circuits 318 are connected to the hardline circuits 308 via connections 402, 403, the switch 442 is open. The bridge 335 may utilize a diplexer 482 exchanging hardline signals 107 to pass RF on the port circuit line 402 and to pass equipment supply voltage on a bridge line 441.

In an embodiment, the bridge may utilize a diplexer 486 exchanging hardline signals 109 to pass RF on the port circuit line 403 and to pass supply voltage from a bridge line 441.

In some embodiments, low pass filtering 484 such as an inductive (L) or inductive-capacitive (LC) filter may be interposed in line 441 between diplexers 482, 486.

When the drop circuits 318 are disconnected from the hardline circuits 308 via connections 402, 403, the switch 442 is closed. In this case, the diplexers 482, 486 RF connections 412, 413 are interconnected by the switch such that second diplexer 486 receives RF signals directly from the first diplexer 482 and receives equipment supply voltage signals from bridge line 441. These RF and equipment supply voltage signals are combined in the diplexer which exchanges signals with the downstream coaxial hardline 109.

RF signals traveling in the opposite direction, from the downstream hardline 109 to the upstream hardline 107, are transported in a similar manner via diplexer 486 and switch 442 (closed switch) or via diplexer 486 and the drop circuits 318 (open switch).

Figure 5A:
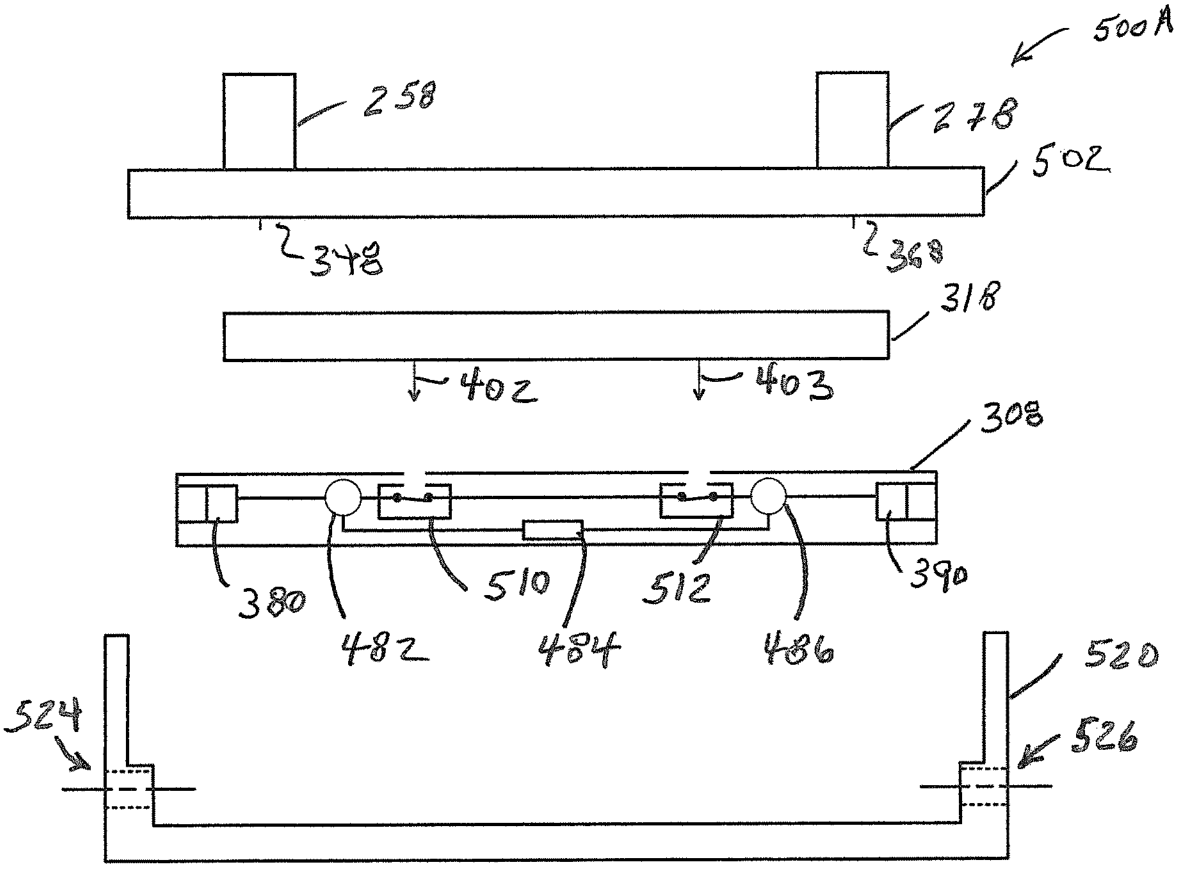
FIG. 5A-B show a first tap assembly with two switches in accordance with embodiments of the present invention.

FIG. 5A shows an exploded view of tap circuits for fitment in a first housing 500A. A metallic base 520 provides a hardline entry 524 and a hardline exit 526. Notably, the base may include respective hardline connectors (not shown). The base is for receiving hardline circuits 308, drop circuits 318, and a metallic face plate 502. When the face plate is joined with the base, a housing for enclosing the tap circuits 308, 318 is provided.

Face plate ports 258, 278 such as F-Type ports include connections 348, 368 for mating with the drop circuits 318. Notably, the ports may be located on the face plate 502 or on the metallic base 520 (not shown). The drop circuits include connectors 402, 403 for mating with the hardline circuits 308. Notably, connectors 402, 403 also operate hardline circuit RF switches 510, 512 for bypassing the drop circuits. Diplexers 482, 486 and low pass filter 484 provide functions similar to those described above. Notably, any of the devices of FIGS. 3A-D, 4A-B may utilize a similar housing.

Figure 5B:
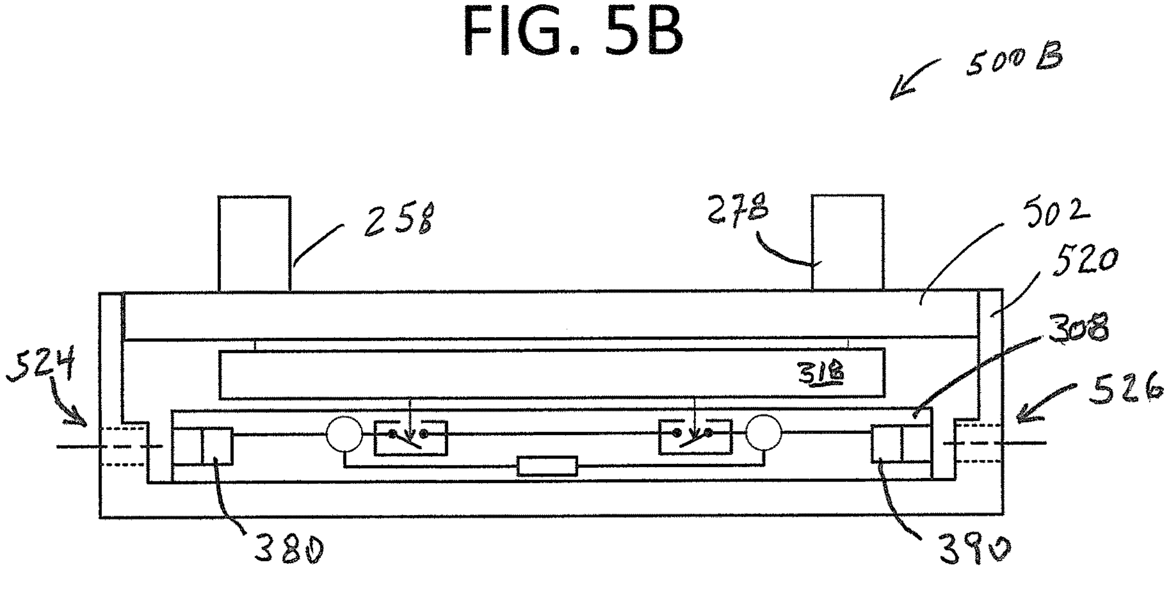

FIG. 5B shows tap circuits fitted into the housing 500B. As seen, the hardline circuits 308 are situated in the bottom of the base 520 and aligned for connection with hardlines at entry 524 and exit 526. Atop the hardline circuits, drop circuits 318 are interconnected via connectors 402, 403 that operate switches 510, 512. Atop the drop circuits, a face plate is interconnected via face plate connections 348, 368 (see FIG. 5C) to service ports 258, 278.

When the tap circuits 308, 318 are assembled into the housing and the face plate 502 is joined with the base 520, tap internals are shielded from electromagnetic interference.

Figure 5C:
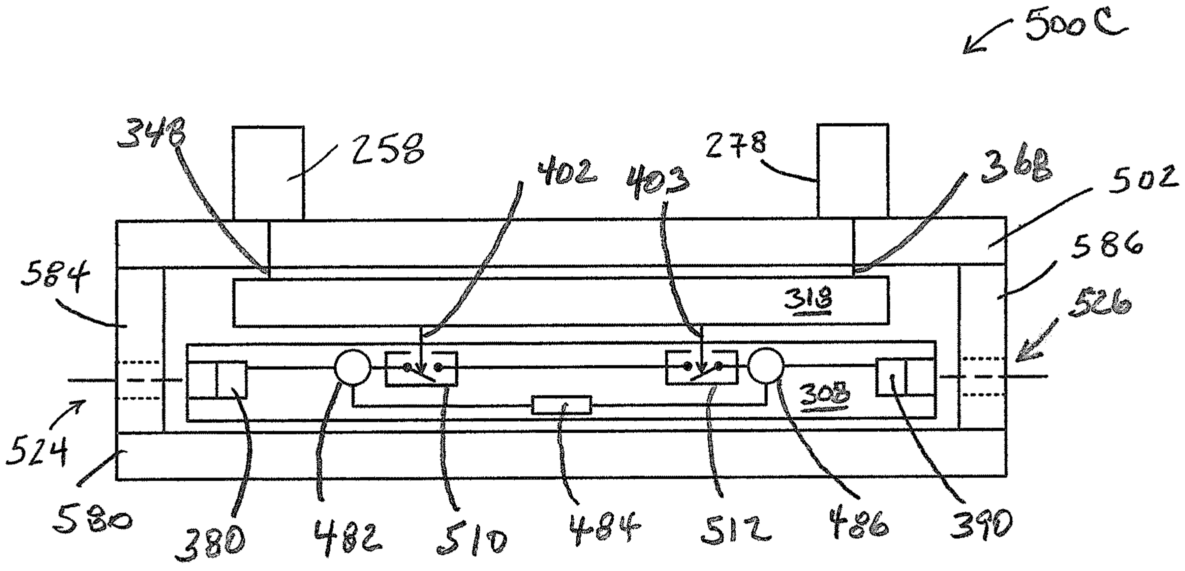
FIG. 5C shows a second tap assembly with two switches in accordance with embodiments of the present invention.

FIG. 5C shows tap circuits fitted into a second housing 500C. Similar to FIG. 5B, here the housing includes a metallic face plate 502, a metallic bottom plate 580, and one or more metallic side walls 584, 586. When joined together, the faceplate, bottom plate, and side wall(s) shield tap internals from electromagnetic interference.

Figure 6:
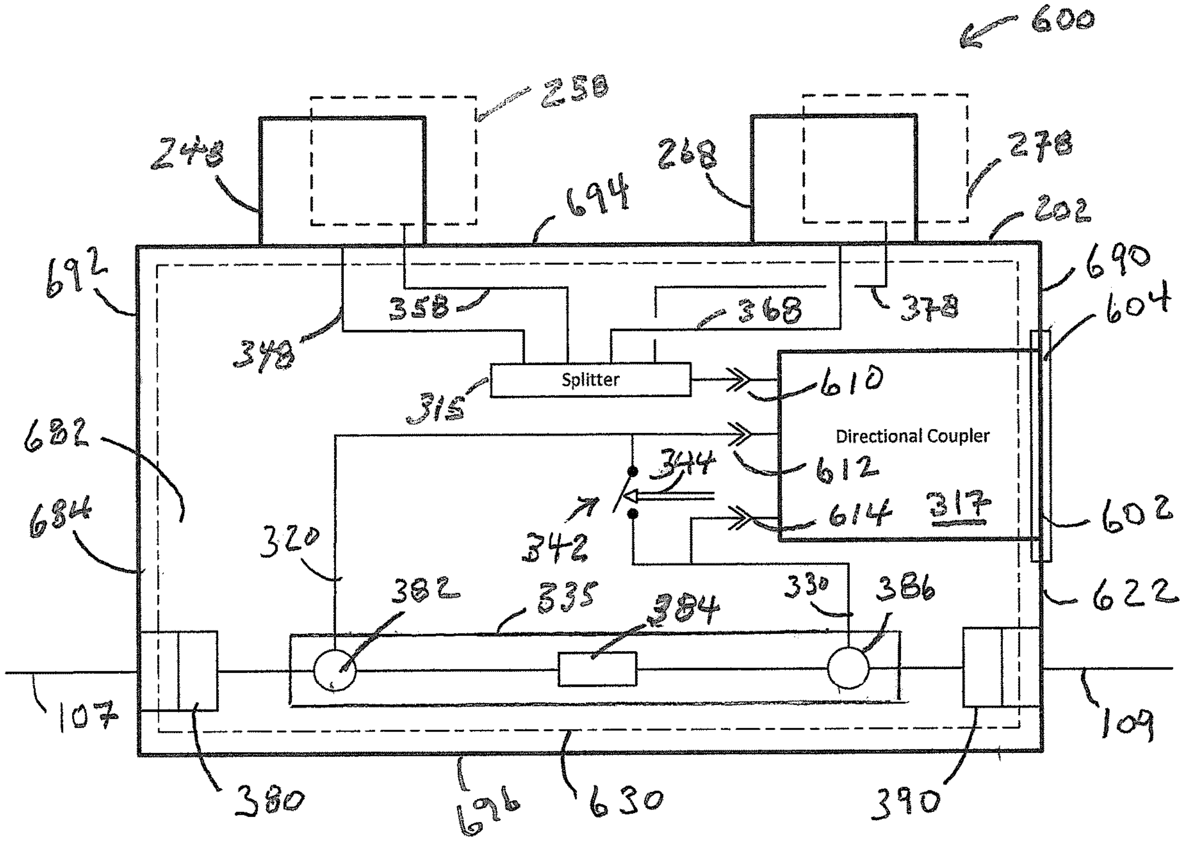
FIG. 6 shows a tap with a removable directional coupler in accordance with embodiments of the present invention.

FIG. 6 shows an exemplary tap with a removable directional coupler 600. Functionally similar to the tap described in FIG. 3A, this tap includes a splitter 315 interconnected between a directional coupler 317 and ports 248, 258, 268, 278 and a bridge 335 interconnected with the directional coupler. The bridge also interconnects the upstream hardline 107 and the downstream hardline 109.

The directional coupler 317 is plugged into the tap via connectors 610, 612, 614 and is removable from the tap when the connectors are separated. Tap internals are within a metallic housing that provides electromagnetic shielding such as ingress and egress shielding.

In some embodiments the splitter 315 and bridge 335 are on a single circuit board 630 within the tap housing 622. In some embodiments, a single motherboard with a plug in daughter assembly/board including the directional coupler 317 is within the tap housing. In some embodiments, the splitter and bridge are on separate circuit boards within the tap housing (not shown).

In an embodiment, a penetration 602 in a tap housing 622 provides a means for removing the directional coupler 317 from the tap as it is unplugged from the connectors. A closure 604 may be provided to cover the penetration, for example to provide electromagnetic shielding.

It should be noted that the penetration 602 is small relative to housing 622 dimensions. For example, the housing face plate 202 may be about 10, 15, 20, or 25 square inches while the penetration may be about 1, 2, or 3 square inches. Therefore, the penetration presents a much smaller area for ingress/egress of RF signals when the closure/access door 604 is removed as compared to when a much larger housing cover (e.g. approximately equal in size to face plate) is removed. Notably, the penetration dimensions can be adjusted/tuned to attenuate RF signals at particular frequencies.

Embodiments of the tap 300A, 400A, 500A-B, 600 include F-Type ports 248, 258, 268, 278 on a removable or irremovable face plate 202 which may or may not include the hardline connections on the face of the face plate or on a side of the face plate. The face plate may be opposite or facing the surface having the penetration 602. The face plate or face of the face plate may be on the same surface as the penetration. The hardline connectors and the F-Type connectors may be located on the same surface.

Figure 7:
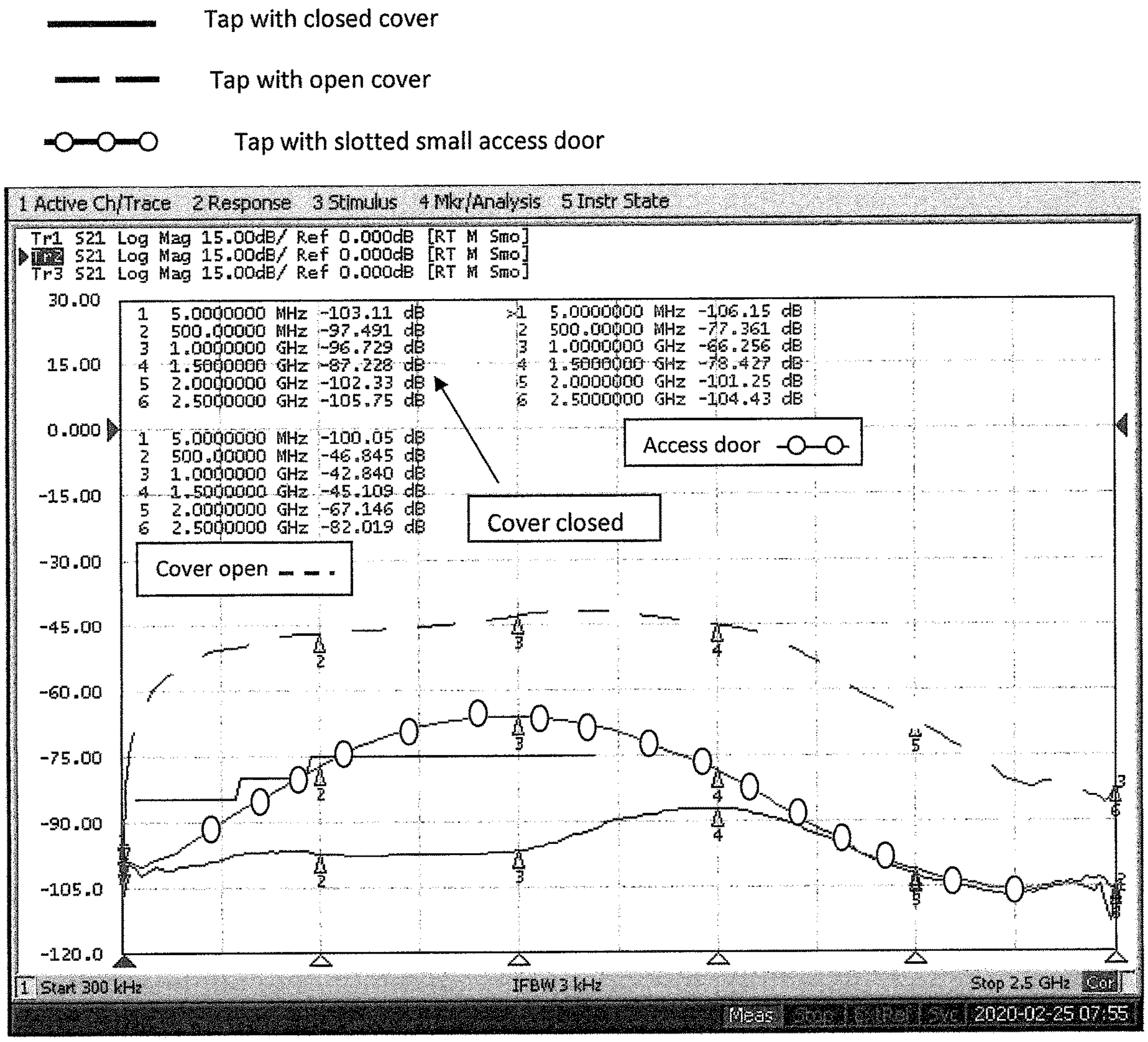
FIG. 7 shows examples of tap shielding in accordance with embodiments of the present invention.

FIG. 7 shows RF a tap with cover dimensions of about 16 square inches and penetration dimensions of about 1.5 square inches (1-inch×0.5 inch). Shielding in dB is shown in the table below.

| | FREQUENCY | |
|---|---|---|
| OPENING | 1.5 GHz | 2.5 GHz |
| Cover Closed (Blue) | −87 dB | −105 dB |
| Cover Open (Green) | −45 dB | −82 dB |
| Access Door Open (Red) | −78 dB | −104 dB |

As seen, the shielding provided by the open access door is close to the same shielding provided by the closed cover. This is in sharp contrast to the shielding provided by the open cover versus the closed cover.

And, as seen, the shielding provided at 1.5 GHz to 2.5 GHz where an access door is opened in lieu of opening a cover is much improved. For example, tap RF signal egress at 1900, 2400, 2500 MHz can create problems such as interference where cellular and WIFI devices utilize similar frequencies.

The penetration may be located in any housing 622 surface. For example, the penetration may be located in a sidewall 690 of the housing 622 as shown. For example, the penetration may be located in another sidewall 692, 694, 696 of the housing. For example, the penetration may be located in a front 682 or rear 684 face of the housing. For example, to the extent the housing is an assembly with a housing front 682 removable from a housing rear 684, the penetration may be in either or both of the housing portion including the front or the housing portion including the rear.

Because the bridge 335 conducts equipment supply voltage low frequency signals from hardline 107 to hardline 109, removal of the directional coupler has no effect on the transfer of equipment supply voltage.

While the directional coupler 317 is connected, an associated actuator 344 holds an RF bypass switch 342 open which allows RF signals from the bridge 335 to pass through the directional coupler and back to the bridge. When the directional coupler is disconnected, the actuator causes the RF bypass switch to close which connects the two bridge RF signal lines 320, 330.

When the tap 600 is operating to service subscribers via the ports 248, 258, 268, 278, RF signals are being passed through directional coupler 317 and equipment supply voltage is being transferred from the upstream hardline 107 to the downstream hardline 109 via the bridge 335. When the directional coupler is removed from the operating tap, the bridge transfer is undisturbed while the RF signal is switched by connecting the bridge RF signal lines 320 and 330. The switching action may be "make before break" where the RF switch is closed before the directional coupler is disconnected.

Figure 8A:
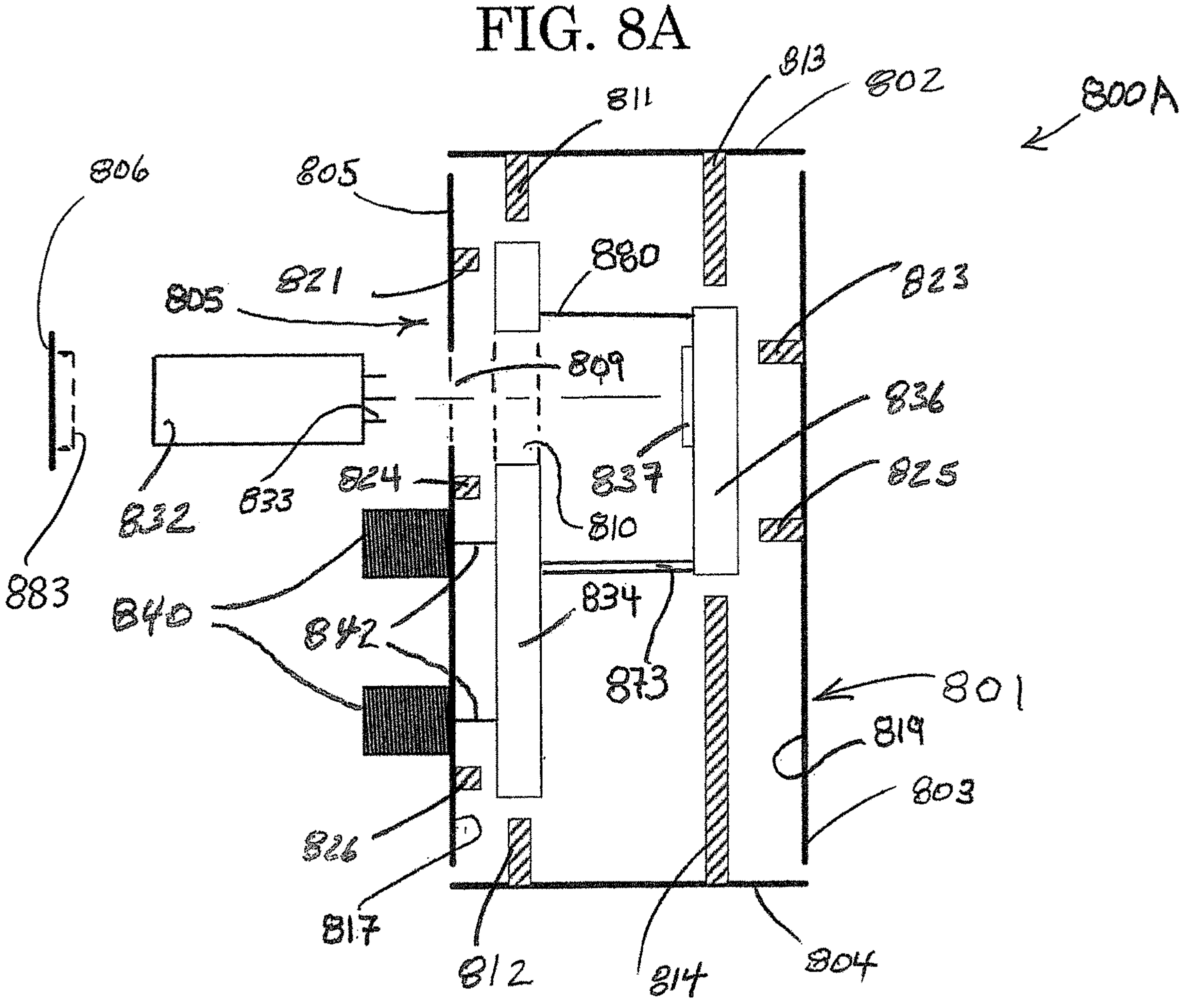
FIGS. 8A-B show another tap embodiment in accordance with embodiments of the present invention.
Figure 8B:
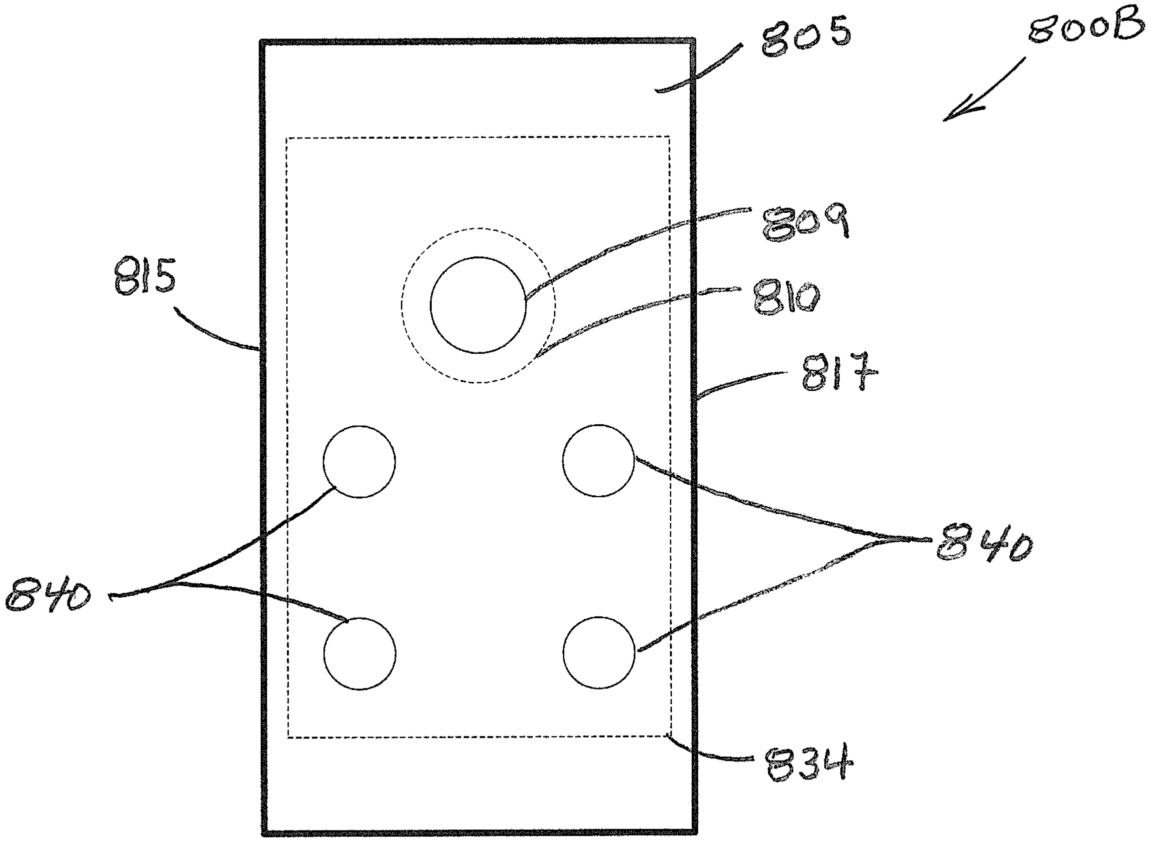

FIG. 8A shows a tap assembly side view 800A. A housing 801 such as a metallic housing includes a face plate 805 opposite or facing a back plate 803, and a first side plate 802 and a second side plate 804. FIG. 8B shows a tap assembly face plate view 800B. In this view, a left side plate 807 and a right side plate 805 along with the third and fourth side plates 815, 817 are shown. The side plates may be individual plates or they may be integrated forming, with or without the front plate, for example, a single structure such as a casting or metallic casting. Not shown are hardline interconnects, see for example FIGS. 3A, 4A, 5A, 6.

The face plate 805 may include suitably mounted F-Type connector ports 840. These ports may be used for subscriber connections.

Within the housing 801 are electrical components such as electrical components mounted on a circuit or printed circuit board(s). Opposite or adjacent to an interior 817 of the face plate 805, a first circuit board 834 interconnects 842 with the ports 840.

In some embodiments, the first circuit board 834 has a penetration, hole, or passage 810. This passage to allow passing of the electronic component 832 therein or therethrough.

Opposite or adjacent to an interior 819 of the back plate 803 is a second circuit board 836. This circuit board has a socket 837 for receiving connectors 833 of the electronic component 832. An electronic link 880 interconnects the first circuit board 834 and the second circuit board 836. In various embodiments this link may be a shielded link and in various embodiments this link may include electronic components such as resistors, capacitors, and inductors. Note that a bypass such as an RF bypass using for example a switch may be incorporated in the socket 837 or in one of the circuit boards 834, 836 such that removal of the electronic component opens or closes the switch (See FIGS. 3B, 4A, 5A, 6).

The circuit boards may be supported by one or more members of the housing 801. For example, the first circuit board 834 may be supported from the face plate 805 with one or more supports 821, 824, 826. For example the first circuit board 834 may be supported 811 from the first side plate 802 and/or supported from 812 the second side plate 804. For example, in a similar manner the first circuit board may be supported from the third side plate and/or the fourth side plate.

For example, the second circuit board 836 may be supported from the back plate 803 with one or more supports 823, 825. For example, the second circuit board 836 may be supported 813 from the first side plate 802 and/or supported 814 the second side plate 804. For example, in a similar manner, the second circuit board may be supported from the third side plate and/or the fourth side plate. For example, the second circuit board 836 may be supported by one or more attachments 873 to the first circuit board 834.

Devices on the first and second circuit boards 834, 836 may include any of diplexers, signal conditioners, directional couplers, splitters, high pass filters, low pass filters and/or band pass filters. In an embodiment, the first circuit board includes a diplexer and a splitter.

Devices included in the electronic component or module 832 may include any of signal conditioners, directional couplers, splitters, high pass filters, low pass filters and/or band pass filters.

In an embodiment, a tap or outdoor tap 800A includes a plug-in directional coupler and/or signal conditioning circuit 832 for connection to a printed circuit board. The printed circuit board may be attached to an interior tap wall such as a tap backwall 819. The directional coupler and/or signal conditioning circuit may be removable through a hole, penetration, or passage 809 in the faceplate.

In some embodiments, the face plate 805 penetration, hole, or passage 809 allows passage of an electronic component 832 such as a plug in electronic module therein or therethrough and in some embodiments a removable cover 806 (round or multi-sided) or plug (round or multi-sided) such as a threaded plug 883 (round) is for blocking and/or sealing the penetration before or after passage of the electronic component. In some embodiments, a threaded plug 883 includes a skirt such as a skirt for pressing an O-Ring against the face plate.

In some embodiments, one or both of socket 837 and circuit board 836 may be replaced by a socket or by an assembly such as a socket or assembly excluding a circuit board. In some embodiments, the electronic module 832 may not pass through a circuit board or may interface with a single circuit board. In some embodiments, the electronic module hole, passage or entryway 809 may be in any face or side of the housing 801 that is not the face plate 805 and may have end contacts or side contacts that contact an appropriate socket.

Figure 8C:
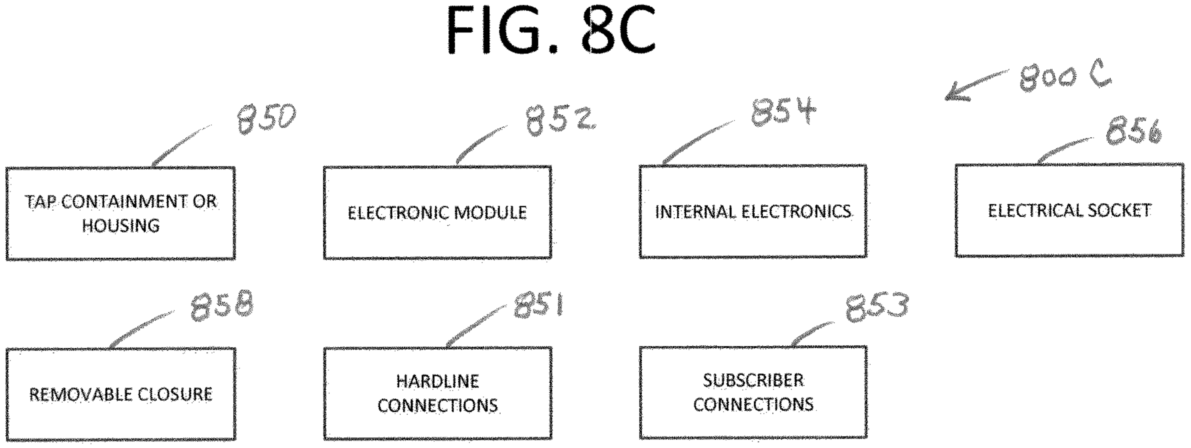
FIGS. 8C-D show a tap with various possible arrangements in accordance with embodiments of the present invention.
Figure 8D:
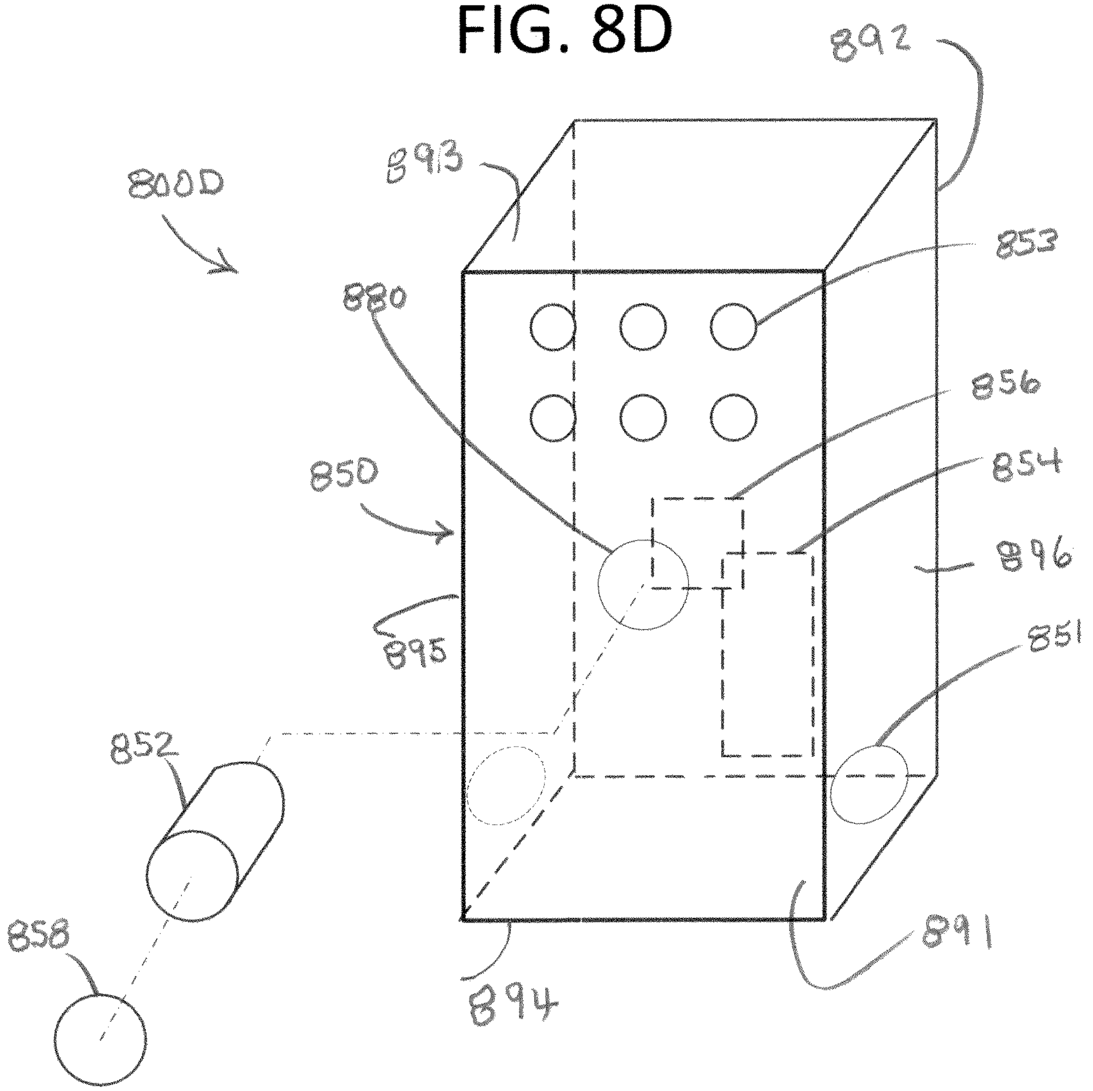

FIGS. 8C-D shows a tap with various possible arrangements 800C-D.

FIG. 8C shows tap elements including a tap containment or housing ("tap housing") and parts or subassemblies which may form parts of the tap 800C. In particular, the tap containment or housing 850 is shown with an electronic module 852 which may be similar to any of the electronic modules described herein and internal electronics 854 which may be similar to the hardline circuits and/or drop circuits described herein.

Mounted to the containment or tap housing 850 are connections and/or coaxial cable connections such as coaxial hardline connections 851 and subscriber ports such as coaxial subscriber ports 853. Tap holes such as tap holes in the tap housing at coaxial hardline connection(s) 851 may accommodate connectors associated with these connections. The connections may be located on one side of the tap housing or on multiple sides of the tap housing. For example, subscriber ports may be on one side and hardline connections on another side. For example one or more subscriber ports may be on a single side or on multiple sides. For example one or more hardline ports may be on a single side or on multiple sides.

In addition, the parts or subassemblies may include an electrical socket 856 that in some embodiments receives an electronic module such as the above-mentioned electrical module 852 and a closure or removable closure 858 for gaining access to an interior of the tap containment or housing. There may be one or more access or entryways in the housing. For example, a closure or removable closure 858 may provide access 880 (See exemplary FIG. 8D) to the socket and an electronic module inserted in the socket via this access. For example, the closure or removable closure may seal or close the access after an electronic module is inserted in the socket. In some embodiments the only access to the tap housing or containment may be via the removable closure or closures.

Mounted to the containment or tap housing 850 are connections and/or coaxial cable connections such as coaxial hardline connections 851 and subscriber ports such as coaxial subscriber ports 853. The connections may be located on one side of the housing or on multiple sides of the housing. For example, subscriber ports may be on one side and hardline connections on another side(s). For example, subscriber connections may be located on the same side, on opposite sides, or on adjacent sides. For example, hardline connections may be located on the same side, on opposite sides, or on adjacent sides.

FIG. 8D shows a schematic of the tap with various possible arrangements 800D. Here, a tap housing 850 has internal electronics 854. A removable electronic module 852 may be inserted into the housing. Further, the removable electronic module may be inserted into the housing via an access or entryway 880 and a removable or permanent closure 858. The closure may be similar to those described herein including a round threaded closure or plug. The closure may be used to close the access before or after the electronic module is inserted. There may be one or multiple sockets 856 and the electrical module may be inserted in a socket. The internal electronics may be a single assembly or multiple assemblies including circuit board(s). The socket and internal electronics may be a single assembly or multiple assemblies including circuit board(s). Electrical connections may include electrical interconnections between any of the socket assembly, the internal electronics, the subscriber connections, and the hardline connections.

The tap housing 850 is multi-sided and any of the sides may be flat, substantially flat, or curved and may be substantially rectangular or not. In various embodiments, the tap housing may have a box-like shape. Any of the sides may be fixed or joined permanently or removably with any adjacent or adjoining sides. Any of the sides or side portions may be removable in whole or in part from adjacent or adjoining side(s). An exemplary tap housing 850 is shown. Here, the housing has multiple sides including front and back sides 891, 892, top and bottom sides 893, 894, and left and right sides 895, 896. Here, any side may be a face plate and any side may be a cover plate.

The subscriber connections or ports 853 may be on any side or on multiple sides (shown on front side 891). The hardline connections or ports 851 may be on any side or on multiple sides (shown on left and right sides 895, 896). The access or entryway 880 may be on any side. One or more accesses or entryways may be on any side or on multiple sides.

In an embodiment, a tap housing 850 has an exterior surface that includes plural subscriber connections, within the tap housing, a socket 856 is interconnected with the circuits. The socket is configured to removably receive an electronic module 852 which includes a directional coupler or a signal conditioner or both a directional coupler and a signal conditioner. An entryway 880 in the exterior surface provides access to the socket and a passage for the electronic module. A removable closure 858 is for blocking the entryway. The tap internals may be accessible only by the entryway in the exterior surface.

In an embodiment, a tap housing 850 has a front face opposite a back face and sidewalls joining the faces. Subscriber ports 853 are located on the front face and configured to interconnect with subscribers. Within the tap housing, circuits are configured to convey the RF signals to subscriber ports and configured to pass RF signals and the equipment supply voltage between the upstream hardline and the downstream hardline. Within the tap housing one or more sockets 856 are interconnected with the circuits, the sockets configured to removably receive respective electronic modules where each module includes a directional coupler or a signal conditioner or both a directional coupler and a signal conditioner. For each socket, an opening in the face plate or sidewalls 880 that is aligned with the socket and a removable closure 858 is for blocking each of the openings. Here, each opening may correspond in size with the electronic module associated with the socket aligned with the opening such that the electronic module may be passed through the opening. But for the one or more openings, the tap may be permanently sealed.

In an embodiment, a tap housing 850 has a front face opposite a back face and sidewalls joining the faces. Tap housing coaxial cable ports at connections 851 are configured to interconnect with an upstream hardline and a downstream hardline and the tap housing front face has plural subscriber connections 853. Within the tap housing, circuits are configured to convey the RF signals to subscriber ports and configured to pass RF signals and the equipment supply voltage between the upstream hardline and the downstream hardline. Within the tap housing, a socket 856 is interconnected with the circuits and the socket configured to removably receive an electronic module, the electronic module including a directional coupler or a signal conditioner or both a directional coupler and a signal conditioner. A tap housing entryway 880 provides access to the socket and a passage for insertion or removal of the electronic module from the tap housing and there is a removable closure 858 for blocking the entryway. The entryway may correspond in size with the associated electronic module such that the electronic module may be passed through the opening.

Figure 9A:
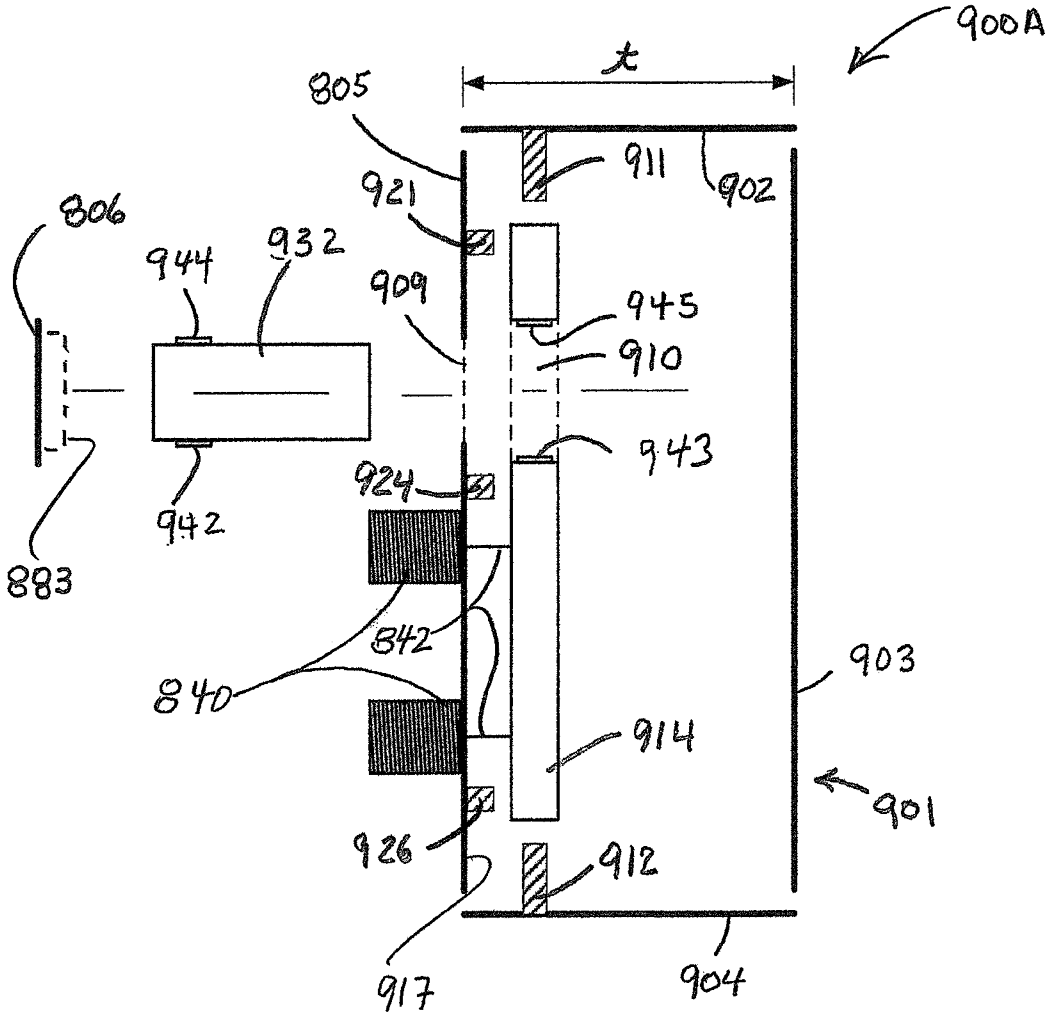
FIG. 9A-D show another tap embodiment in accordance with embodiments of the present invention.

FIG. 9A shows a side view of another tap assembly 900A similar to the tap assembly of FIG. 8A. A housing 901 such as a metallic housing includes a face plate 905 opposite or facing a back plate 903, and a first side plate 902 and a second side plate 904. Also included are side plates similar to 815, 817. The side plates may be individual plates or they may be integrated forming, with or without the front plate, for example, a single structure such as a casting or metallic casting. Not shown are hardline interconnects, see for example FIGS. 3A, 4A, 5A, 6.

In some embodiments, the face plate 905 has a penetration, hole, or passage 909 to allow passing of an electronic component or module 932 such as a plug in electronic module therein or therethrough and in some embodiments a removable cover or plug such as a threaded plug 906 is for blocking the penetration before or after passage of the electronic component.

The face plate 905 may include suitably mounted F-Type connector ports 940. These ports may be used for subscriber connections.

Within the housing 901 are electrical components such as electrical components mounted on one or more circuit boards. In the embodiment shown, a single circuit board 914 is used and ports such as F Type ports mounted to the face plate are connected 942 to the circuit board. Note that the thickness "t" of the tap 900A may be reduced from that shown in FIG. 8A where there is a single circuit board or where circuit boards do not overlap.

In some embodiments, the circuit board 914 has a penetration, hole, or passage 910. This passage to allow passing of the electronic module 932 therein or therethrough.

The circuit board may be supported by one or more members of the housing 901. For example, the circuit board 914 may be supported from the face plate 905 with one or more supports 921, 924, 926. For example the circuit board may be supported from the first side plate 902 and/or supported from 912 the second side plate 904. For example, in a similar manner the first circuit board may be supported from third and fourth side plates interconnecting with the first and second side plates 902, 904.

Devices on the circuit board 914 may include any of diplexers, signal conditioners, directional couplers or removably attached directional couplers, splitters, high pass filters, low pass filters and/or band pass filters. In an embodiment, the circuit board includes a diplexer, removably attached directional coupler, and splitter. In an embodiment, the circuit board includes a diplexer, removably attached directional coupler, splitter, and connections to upstream and downstream hardlines (see FIG. 3A) that transport RF signals and equipment supply voltage signals;

Devices included in the electronic component or module 932 may include any of signal conditioners, directional couplers, splitters, high pass filters, low pass filters and/or band pass filters. In an embodiment, devices included in the electronic component or module include a directional coupler and optionally a signal conditioner.

The electronic module 932 may include electrical contacts such as side mounted electrical contacts 942, 944 for contact with circuit board contacts such as side mounted electrical contacts 943, 945. When mated, these contacts may provide for electrical connection of the electronic device 932 with the circuit board 914. The number of contacts may vary according to the requirements of interfacing the electronic device with other circuitry, for example with the circuit board.

In some embodiments circuit board contacts 943, 945 are not as shown in FIG. 9A. Rather, the circuit board contacts are planar with the circuit board such that the circuit board contacts and the module side mounted contacts 942, 944 lie in or near a common plane such as the plane of the circuit board or the plane of a side of the circuit board. This contact arrangement may facilitate component manufacturing such as where a circuit board hole is used. This contact arrangement may improve operation of circuit components at high frequencies such as operation reaching and beyond 2 GHz.

In an embodiment, a tap or outdoor tap 900A includes a plug-in directional coupler and/or signal conditioning circuit 932 for connection to a printed circuit board such as printed circuit board 914. The printed circuit board may be attached to a tap interior such as to a faceplate interior wall 917. The directional coupler and/or signal conditioning circuit may be removable through a hole, penetration, or passage 909 in the faceplate which may be sealed/covered by a cover or plug such as a threaded plug 806.

In some embodiments, the face plate 805 penetration, hole, or passage 809 allows passing of an electronic component 932 such as a plug in electronic module therein or therethrough and in some embodiments a removable cover 806 (round or multi-sided) or plug (round or multi-sided) such as a threaded plug 883 (round) is for blocking and/or sealing the penetration before or after passage of the electronic component. In some embodiments, a threaded plug 883 includes a skirt such as a skirt for pressing an O-Ring against the face plate.

Figure 9B:
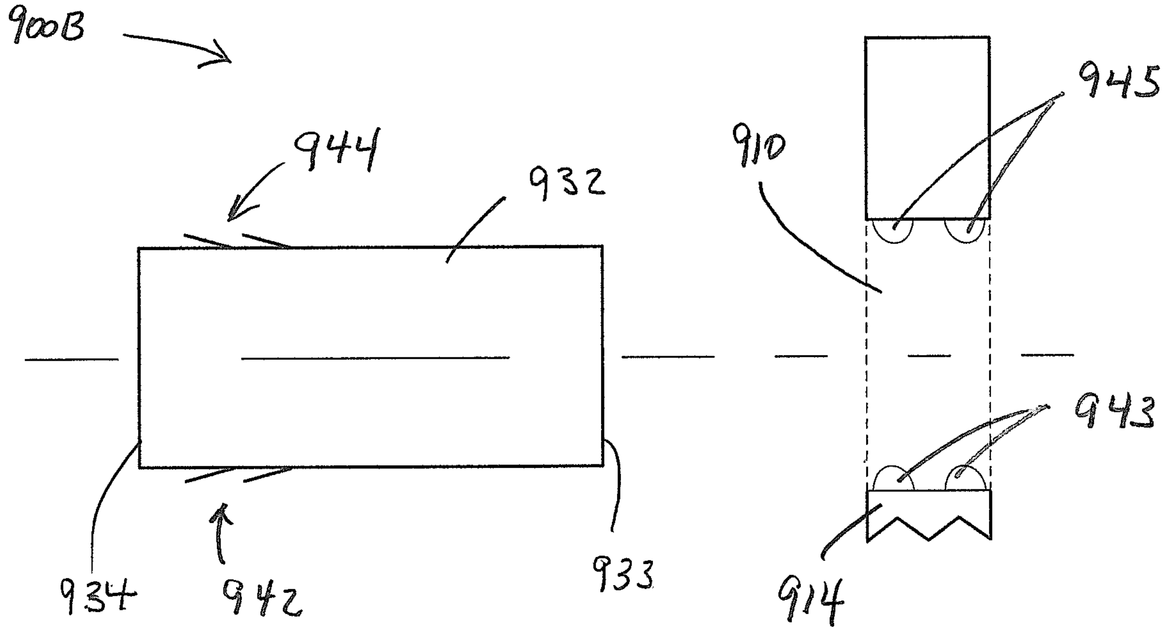

FIG. 9B shows an embodiment having a first arrangement of circuit board contacts 900B. Here, electronic module 932 has an insertion end 933 and a trailing end 934. A first set of peripheral electrical contacts 942 and a second set of peripheral contacts 944 extend from the electronic device near the trailing end.

When the electronic module 932 is inserted in the circuit board hole or passage 910, electronic module contacts (e.g. 942, 944) can be located to connect with the circuit board contacts 943, 945. For example, module contacts 942 can connect with circuit board contacts 943 and module contacts 944 can connect with circuit board contacts 945.

Note that while the circuit board 914 is shown with opposed sets of two contacts 943, 945, any number of contacts may be provided to mate with corresponding contacts on the electronic module 932. Further, any of the contacts may be biased by inherent spring characteristics or by a separate spring. For example, contacts 942, 944 may be wipers that are biased by inherent spring characteristics to press against mating circuit board contacts 943, 945.

Figure 9C:
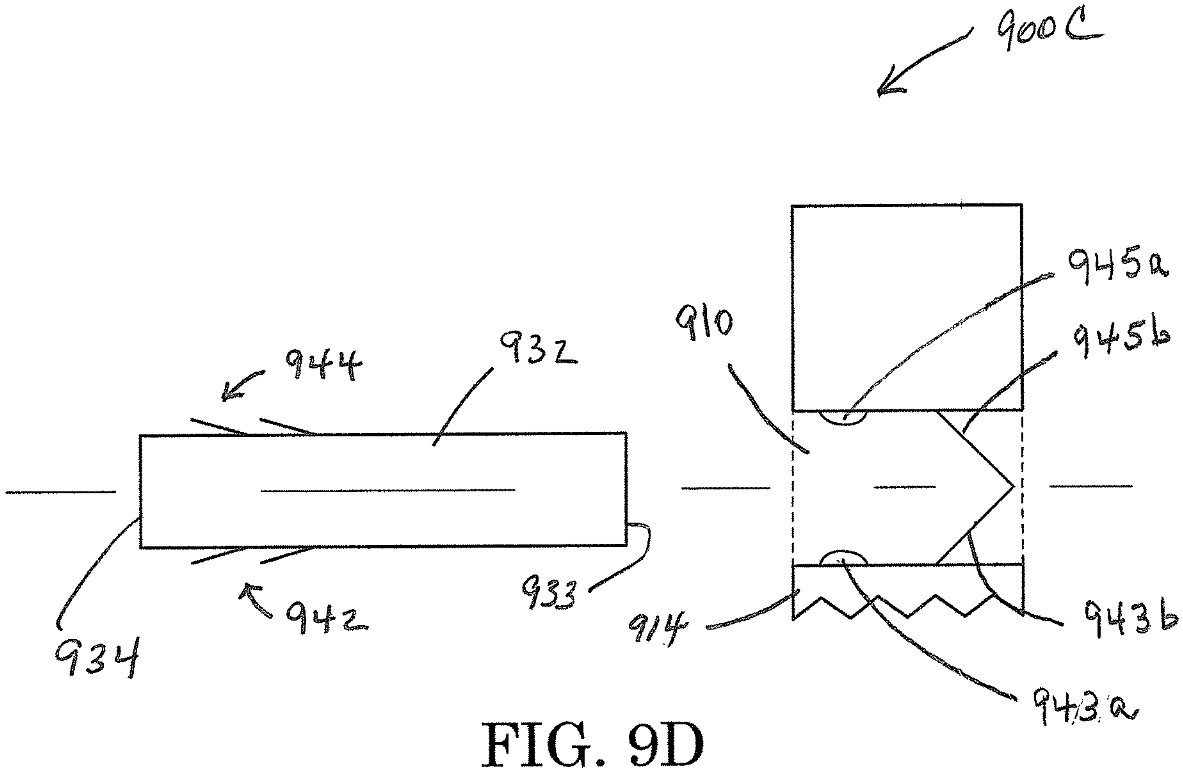
Figure 9D:
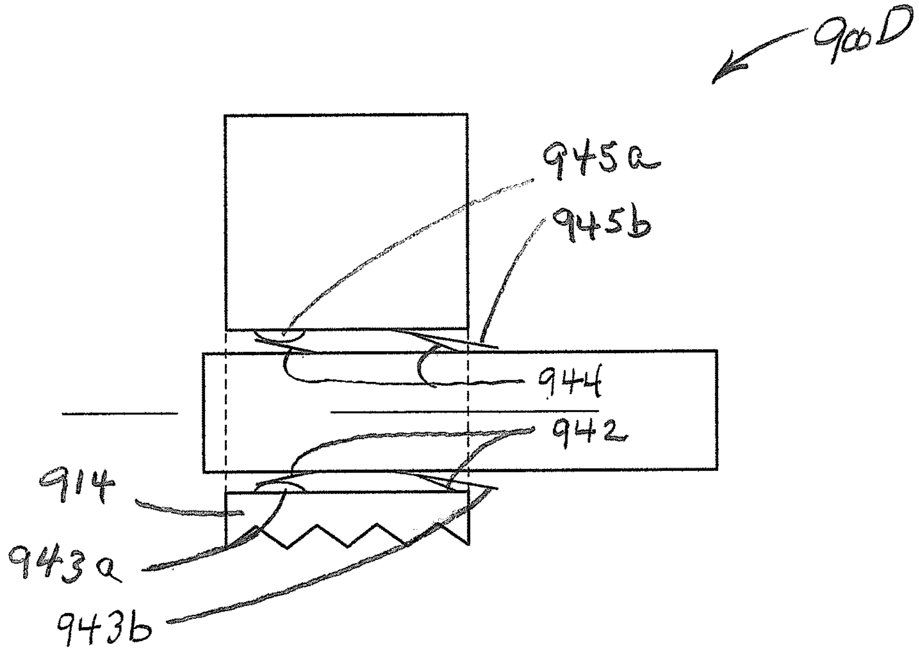

FIGS. 9C-D show an embodiment having a second arrangement of circuit board contacts 900C-D. Here, electronic module 932 has an insertion end 933 and a trailing end 934. A first set of peripheral electrical contacts 942 and a second set of peripheral contacts 944 extend from the electronic device near the trailing end.

As above, the electronic module 932 is for insertion in the circuit board hole or passage 910. Circuit board contacts include 943*a*, 943*b* for mating with electronic module contacts 942. Circuit board contacts include 945*a*, 945*b* for mating with electronic module contacts 944.

Note that circuit board contacts 943*b*, 945*b* are in a first contacting position in FIG. 9C. This contact may provide for a bypass function such as an RF bypass or a hardline RF bypass that is operative when the electronic module 932 is removed from the circuit board 914 (See FIG. 3B, 4A, 5A, 6). For example, where the electronic module includes a directional coupler, the bypass may operate when the directional coupler is removed from the tap. For example, where a circuit between circuit board contacts is provided by an inserted electronic module, this circuit may be replaced by the bypass when the module is removed.

When the electronic module 932 is inserted in the circuit board 914, circuit board contacts 943*b*, 945*b* are in a second non-contacting position. For example, they are separated and come into contact with respective electronic module contacts in contact sets 942, 944 as shown in FIG. 9D.

Note that while the circuit board 914 is shown with opposed sets of two contacts 943*a*, 943*b* and 945*a*, 945*b*, any number of contacts may be provided to mate with corresponding contacts on the electronic module 932. Further, any of the contacts may be biased by inherent spring characteristics or by a separate spring. For example, contacts 942, 944 may be wipers that are biased by inherent spring characteristics to press against mating circuit board contacts 943, 945.

Figure 10:
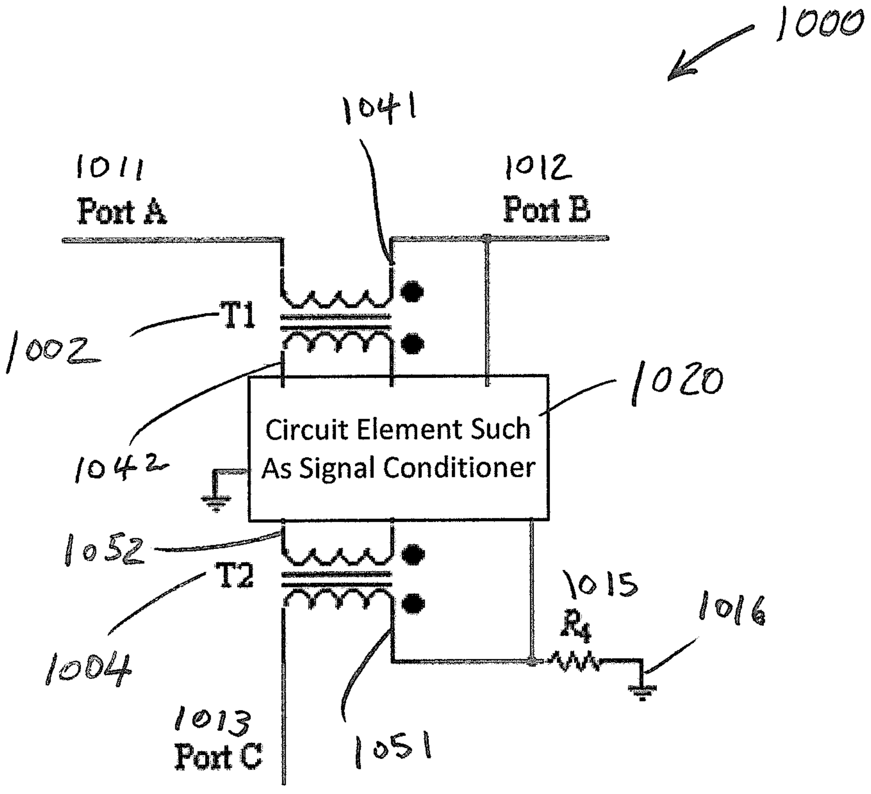
FIG. 10 shows another directional coupler embodiment in accordance with embodiments of the present invention.

FIG. 10 shows an embodiment with yet another electronic component or module 1000. This module includes a directional coupler 1002, 1004 and a circuit element 1020 such as a signal conditioner. The circuit element may incorporate one or more filters and/or include one or more components such a capacitor, inductor, or resistor.

As shown, the electronic module 1000 includes the circuit element 1020 between and electrically interconnected with the secondary winding 1042 of a first transformer 1002 and the secondary winding 1052 of a second transformer 1004. The primary winding 1041 of the first transformer may connect Port A 111 to Port B 1012 or may connect an input port to a transmitted port. The primary winding 1051 of the second transformer may connect Port C to a ground 1016 as shown (e.g. via a resistor 1015) or may connect a coupled port to an isolated port.

Transformer 1002, 1004 windings may be designed to enable the circuit element 1020 to operate at an impedance other than the impedance of the primary windings 1041, 1051. For example, the transformers may match approximately 75 ohm primary windings with higher impedance secondary windings. These higher impedance secondary windings may enable the circuit element to operate at an impedance higher than 75 ohms. For example, to the extent that the circuit element includes one or more capacitors and/or inductors, the size and or value of these components may be changed and/or reduced at higher impedances enabling the size of the circuit element to be reduced.

Turning now to another embodiment, FIGS. 11A-B and 12A-J show how a preexisting tap 1100A-B may be retrofitted or refurbished 1200A-J such that operation at frequencies up to 1.8 Gigahertz and above may be supported. Among other things, this embodiment may be used when retrofitting an existing tap. For example, it may be desired to leave undisturbed that part of an existing installed tap (e.g., the housing) that is connected to hardline coaxial cable. This may be desirable for various reasons including the inability to trim the hardline and/or make new hardline connections. Existing installed tap housings may include means for securing a circuit board such as one or more tapped holes for receiving screw(s) which secure the board.

Figure 11A:
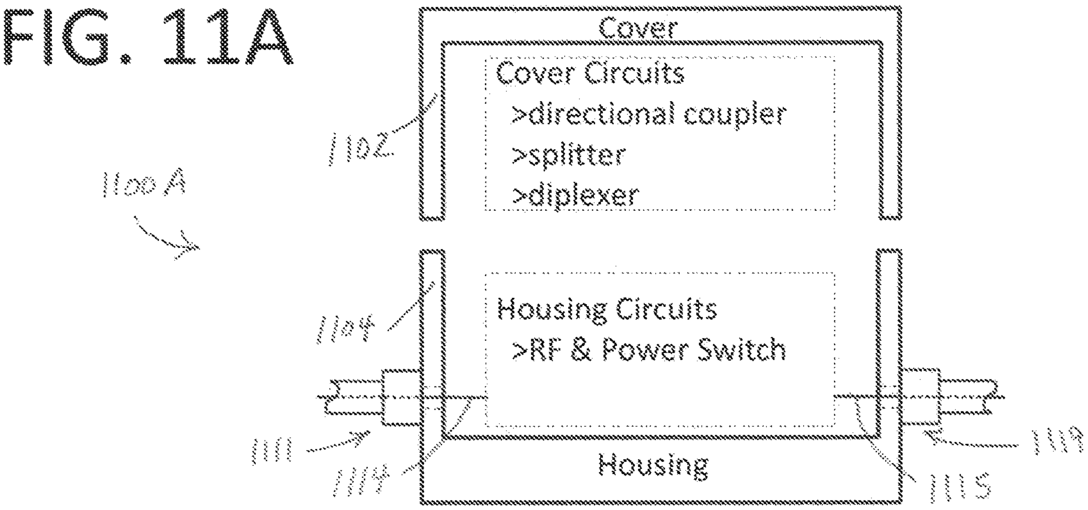
FIGS. 11A-B show a tap having a switch for passing RF and power.
Figure 11B:
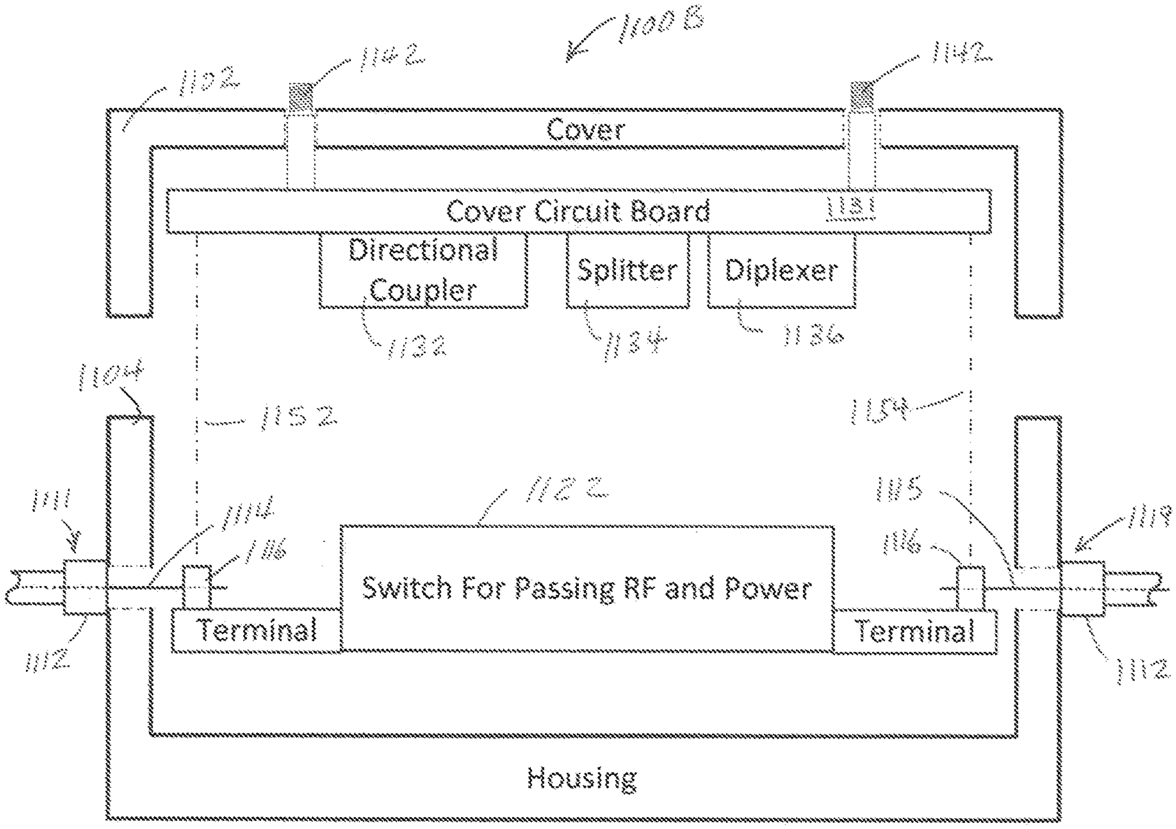

FIGS. 11A-B show a schematic similar to a preexisting tap 1100A-B. In FIG. 11A a cover 1102 and a housing 1104 are shown. The cover is for mating with the housing.

FIG. 11A shows, associated with the cover 1102, cover circuits including a diplexer, a directional coupler, and a splitter. Associated with the housing is a switch for passing RF and power.

In FIG. 11B, a more detailed view of the tap is provided. Here, a cover 1102 is for mating with a housing 1104. Within or attached to the cover is a circuit board 1131 populated with a diplexer 1136, a directional coupler 1132, and a splitter 1134.

Upstream 1111 and downstream 1119 coaxial cables such as hardline coaxial cables connect with the housing 1104 for example via connectors 1112. Stingers or center conductors 1114, 1115 from these coaxial cables protrude into the housing and are cinched at terminals 1116. Interconnecting the terminals 1116 is the RF and power switch 1122 which passes RF and Power between the terminals when the cover is removed and the switch is closed.

In various embodiments, the upstream and downstream coaxial cables mentioned herein may have center conductors that connect directly to circuits within the tap. In various embodiments, the upstream and downstream coaxial cables mentioned herein may have center conductors bearing or connected with a conductive pin that connects directly to circuits within the tap.

When the cover 1102 is mated with the housing 1104, the RF and power switch 1122 is open. When the RF and Power switch is open, a circuit between terminals 1116 includes conductors 1152, 1154, the diplexer 1136, directional coupler 1132, and splitter 1134. This circuit passes RF and power signals.

When the cover 1102 is separated from the housing 1104, the RF and power switch is closed. When the RF and power switch is closed, the upstream 1111 and downstream 1119 coaxial cables are interconnected via the RF and power switch. Here, RF signals are not available at the splitter outputs 1142.

FIGS. 12A-E show reuse of an existing or legacy tap 1200A-E. For example, a retrofit that reuses at least a tap housing 1104 of 1100B or a similar housing, for example without removing the housing from a cable distribution system. Circuits associated with the housing 1104 and/or cover 1202 may be replaced. The cover may also be replaced. In an exemplary context, a pre-existing housing installed in a cable distribution system may be retrofitted in place by operations including a) removal and replacement of a housing circuit board and b) removal and replacement of the cover and a cover circuit board.

Figure 12A:
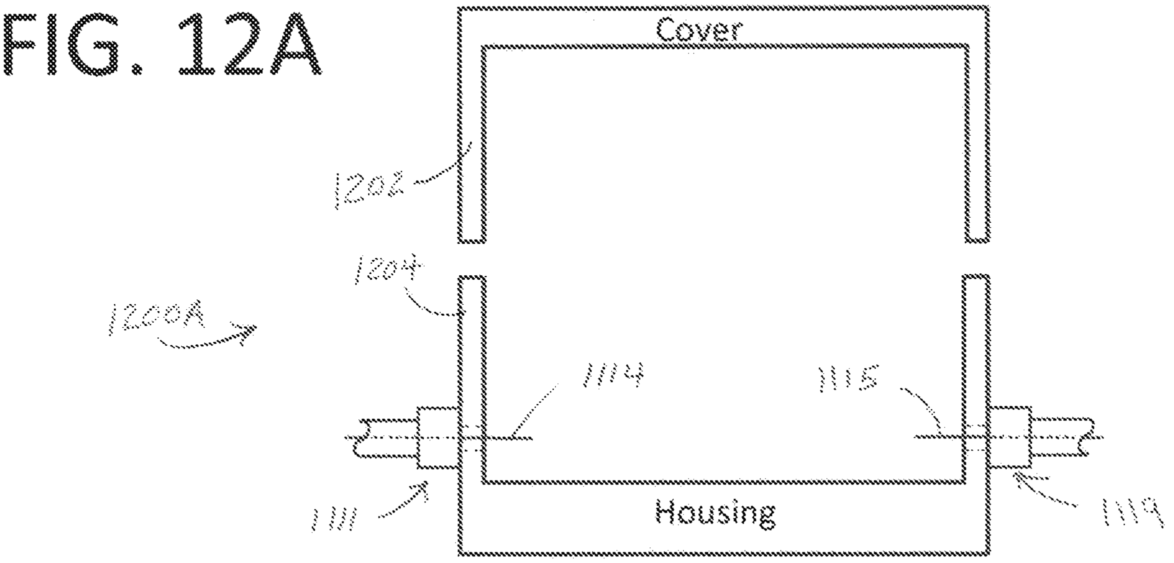
FIGS. 12A-E show a tap having a directional coupler associated with or within a cover in accordance with embodiments of the present invention.

FIG. 12A shows a tap 1200A including a housing 1104 and a cover 1202. The housing may be a pre-existing housing where the housing circuit board or electronics have been removed. Before a retrofit the housing may be installed in a cable distribution system as evidenced by coaxial connectors or hard line coaxial connectors 1111, 1119 that may connect with the housing such that coaxial cable central conductors or stingers 1114, 1115 protrude into the housing.

Figure 12B:
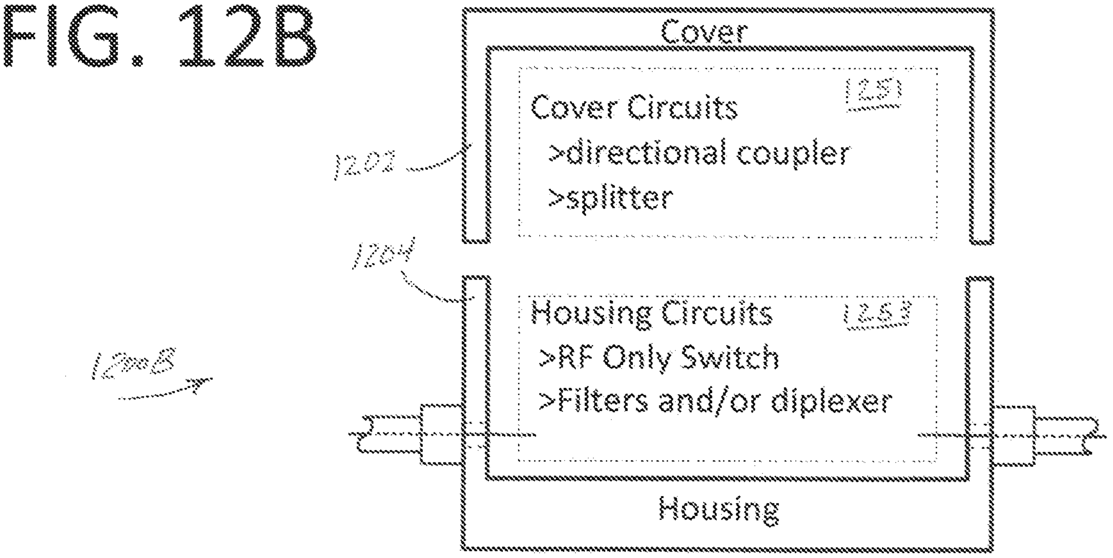

FIG. 12B shows associated with the cover 1202 are cover circuits 1251 including a directional coupler and a splitter. In some embodiments, the cover may be a multipiece cover. Associated with the housing are housing circuits 1253 including an RF-only switch along with filter(s) and/or diplexer(s). In some embodiments, the RF-only switch is removable with the cover when the cover is removed from the housing.

Figure 12C:
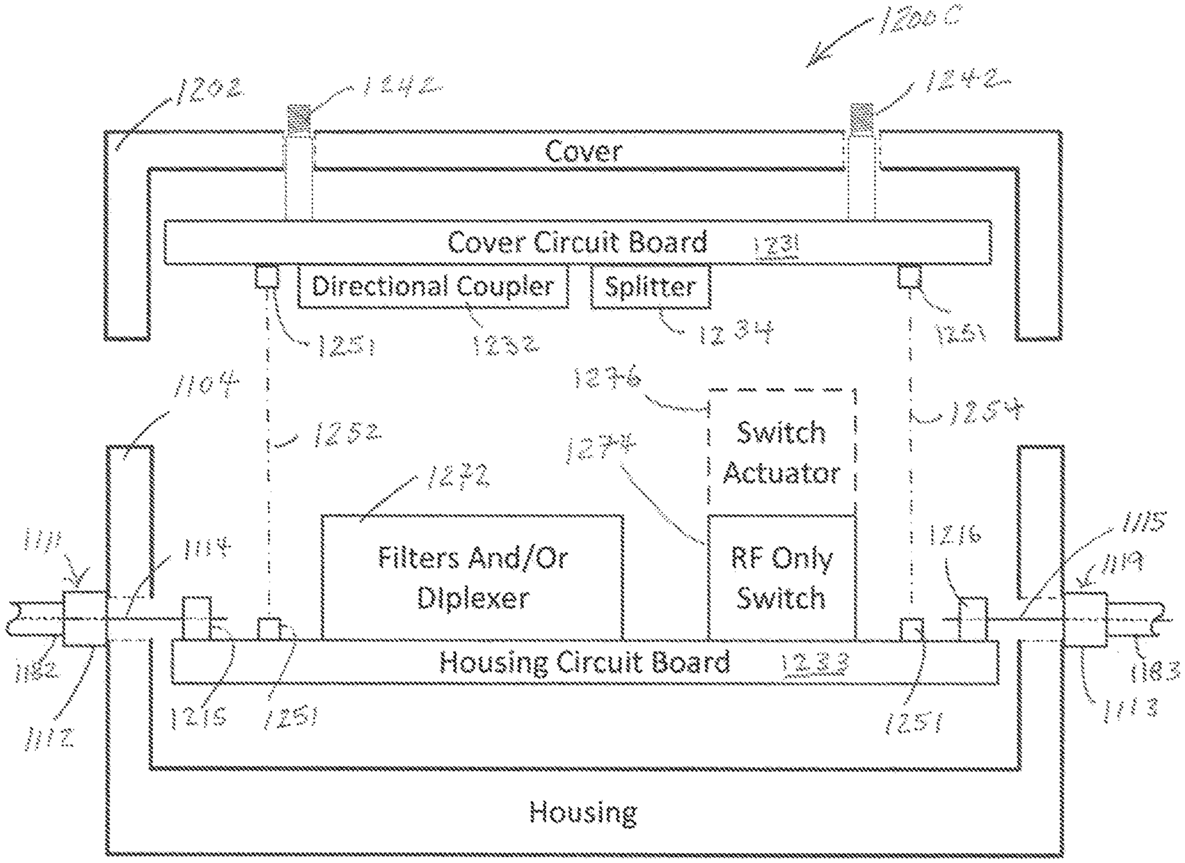

In FIG. 12C, a more detailed view of the tap is provided. Here, a cover 1202 is for mating with a housing 1104. A cover circuit board 1231 may be populated with a directional coupler 1232, and a splitter 1234.

Upstream 1111 and downstream 1119 coaxial cables such as hardline coaxial cables 1182, 1183 connect with the housing 1104 for example via connectors 1112 and 1113. Stingers 1114, 1115 from these coaxial cables protrude into the housing and connect at housing circuit board 1233 terminals 1215 and 1216. The housing circuit board may be populated with filter(s) and/or diplexer(s) 1272. The housing circuit board may include an RF-only switch 1274 operated by a switch actuator 1276. The housing circuit board and the cover circuit may be interconnected by one or more circuits 1252, 1254 and connectors 1251. These circuits may transport RF signals and other signals or only RF signals. The housing circuit board 1233 and/or housing electronics may be included in an enclosed or partially enclosed cover (see FIG. 15C and item 1518) and such an assembly may be referred to as a module or housing module.

When the cover 1202 is mated with the housing 1104, the RF-only switch is open. When the RF-only switch is open, RF signals pass through the directional coupler 1232 and the splitter 1234. Notably, when the RF switch is open, power passes between the terminals 1215 and 1216 via the filter(s) and or diplexer(s) 1272. Splitter outputs 1242 provide subscriber connections.

When the cover 1202 is separated from the housing 1104, the RF-only switch is closed. When the RF-only switch is closed, RF-only signals pass through the switch. Notably, when the RF switch is closed, power passes between the terminals 1215 and 1216 via the filter(s) and or diplexer(s) 1272. Here, RF signals are not available at the splitter outputs 1242.

Figures 12D, 12E:
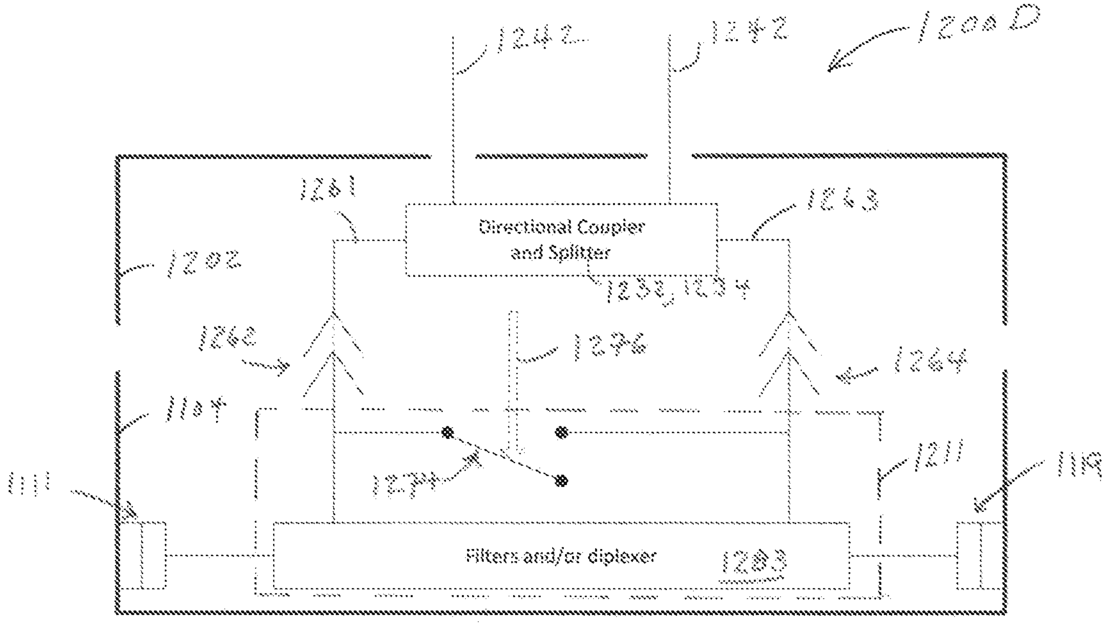

FIG. 12D shows a schematic of the uninterruptable tap with a tap housing 1104 and tap cover 1202 for enclosing tap circuitry. Associated with or within with the housing is a housing circuit 1211 including a continuous power passing device, element or module ("device") 1283 and an RF-only switch 1274 which may be operated by actuator 1276. The continuous power passing device interconnects an upstream coaxial connection 1111 with a downstream coaxial connection 1119. Continuous power passing may be accomplished using any suitable circuit such as a bridge 335 (see FIG. 3A) or one or more of circuits including filter(s) and/or diplexer(s).

Associated with or within the cover, a directional coupler 1232 and/or a splitter 1234 interconnect with subscriber ports 1242. The directional coupler and/or splitter may be replaced by suitable device(s) which provide similar functions such as coupling power flowing in one direction and/or splitting a signal.

The directional coupler and/or splitter 1232, 1234 are interconnected with the continuous power passing device 1283 via RF signal lines 1261 and 1263 which may include one or more corresponding separable connectors 1262 and 1264. Interconnecting the two signal lines is the RF-only switch 1274 which when closed, bypasses the directional coupler and splitter. Switch actuator 1276 is for opening and closing the switch.

FIG. 12E shows a switch table. The RF-only switch may be operated by movement of one of the tap components relative to another of the tap components. For example, when the housing 1104 and cover 1202 are mated, the switch actuator 1276 may operate to open the RF-only switch such that the directional coupler and splitter receive an RF signal for servicing the subscriber ports 1242. The RF-only switch may be any suitable switch, for example any suitable RF-only switch such as one selected from the switches described herein.

When the housing 1104 and cover 1202 are separated, the switch actuator 1276 may operate to close the RF-only switch such that the two signal lines 1261 and 1263 are interconnected.

FIGS. 13A-E show a retrofit that reuses the housing 1104 of 1100B or a similar housing, for example without removing the housing from a cable distribution system. Circuits associated with or within the housing 1104 and/or cover 1202 may be replaced. The cover may also be replaced. In an exemplary context, a pre-existing housing installed in a cable distribution system may be retrofitted in place by operations including a) removal and replacement of a housing circuit board and b) removal and replacement of the cover and a cover circuit board.

Figure 13A:
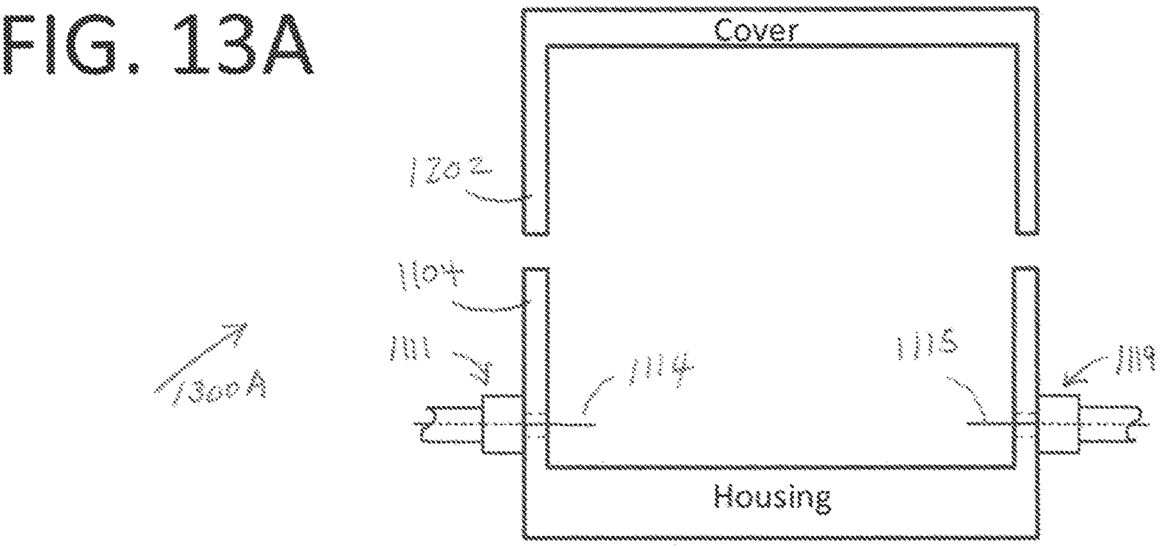
FIGS. 13A-E show a tap having a directional coupler associated with or within a housing in accordance with embodiments of the present invention.

FIG. 13A shows a tap 1300A including a housing 1104 and a cover 1202. The housing may be a pre-existing housing where the housing circuit board or electronics have been removed. Before a retrofit, the housing may be installed in a cable distribution system as evidenced by coaxial connectors or hard line coaxial connectors 1111, 1119 that may connect with the housing such that coaxial cable central conductors or stingers 1114, 1115 protrude into the housing.

Figure 13B:
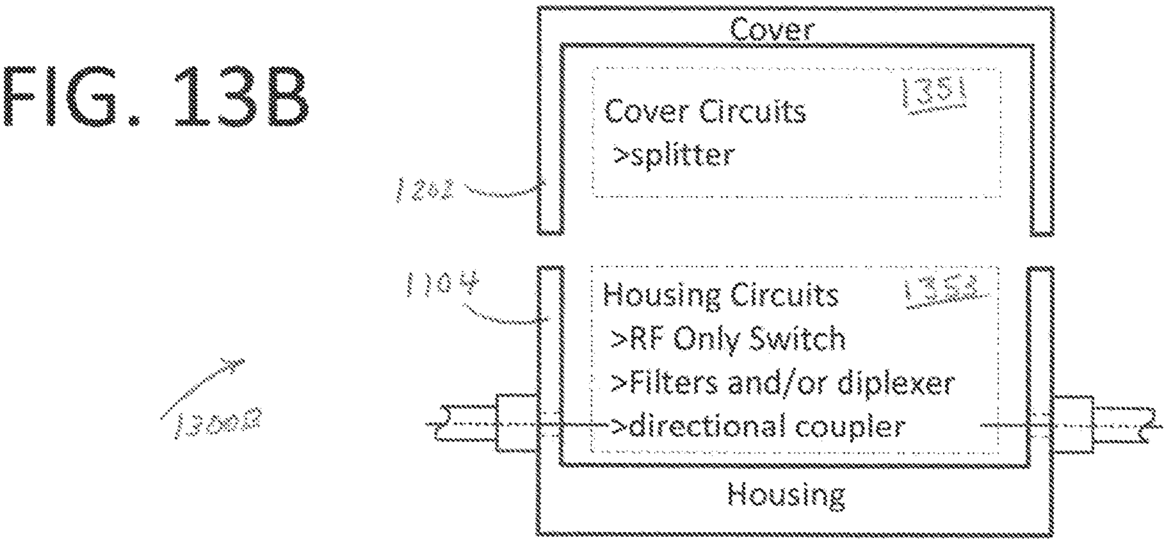

FIG. 13B shows associated with or within the cover 1202 are cover circuits 1351 including a directional coupler and a splitter 1300B. Associated with or within the housing 1104 are housing circuits 1353 including an RF-only switch along with filter(s) and/or diplexer(s).

Figure 13C:
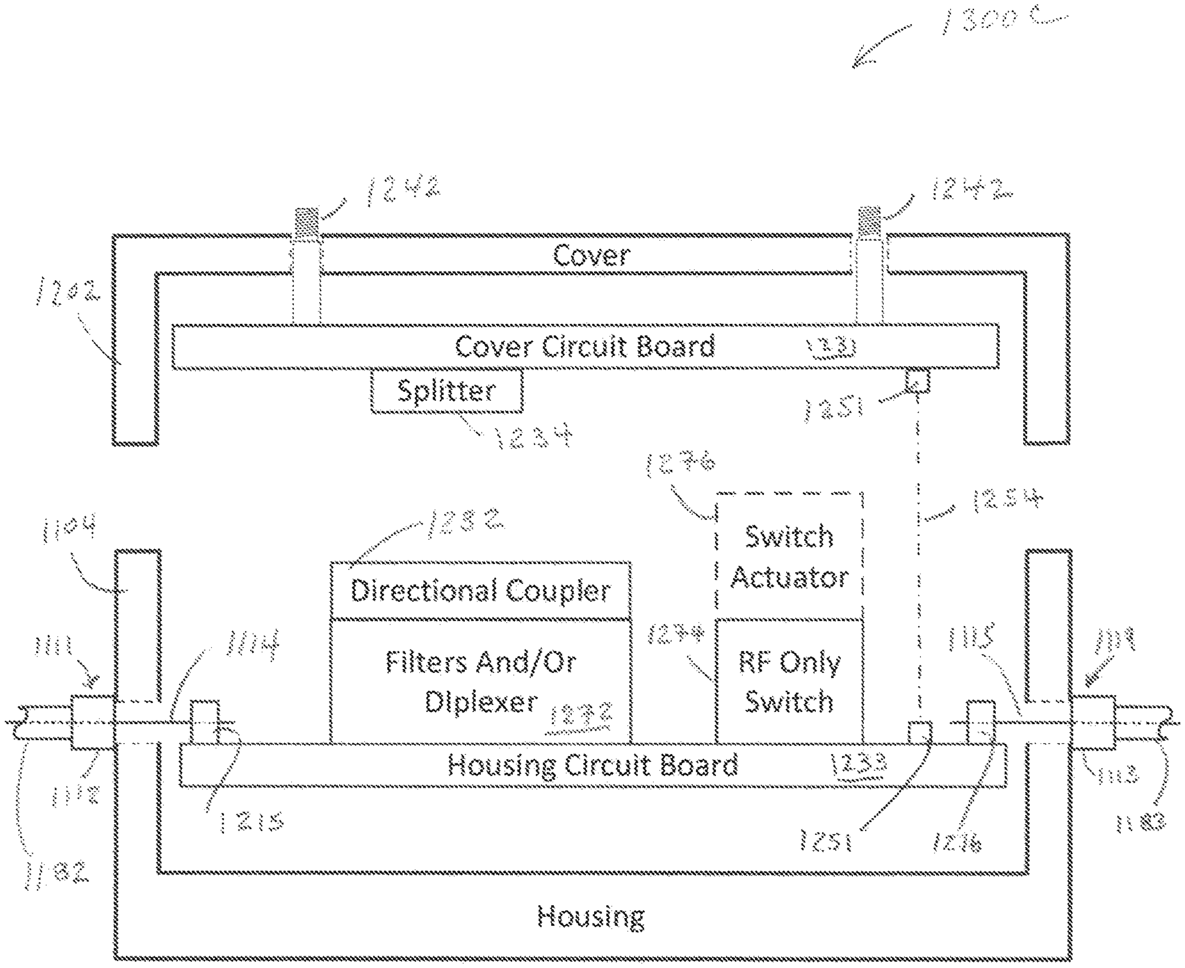

In FIG. 13C, a more detailed view of the tap is provided 1300C. Here, a cover 1202 is for mating with a housing 1104. A cover circuit board 1231 may be populated with a splitter 1234.

Upstream 1111 and downstream 1119 coaxial cables such as hardline coaxial cables 1182, 1183 connect with the housing 1104 for example via connectors 1112 and 1113. Stingers 1114, 1115 from these coaxial cables protrude into the housing and connect at a housing circuit board 1233 terminals 1215 and 1216. The housing circuit board may be populated with filter(s) and/or diplexer(s) 1272. The housing circuit board may include a directional coupler 1232. The housing circuit board may include an RF-only switch 1274 which may be operated by a switch actuator 1276. The housing circuit board and the cover circuit board are interconnected, for example the interconnection may be a single circuit between connectors 1251. This circuit may transport RF signals and other signals or only RF signals. In cases, the housing circuit board may be referred to as a multi-function circuit board.

The directional coupler 1232 may be removable. Directional coupler removal may be provided for when the cover 1202 is separated from the housing 1104. As indicated above, directional coupler removal may be provided for via a plug or entry way through the cover or housing through which the directional coupler may pass.

When the cover 1202 is mated with the housing 1104, the RF-only switch is open. When the RF-only switch is open, RF signals pass through the directional coupler 1232 and the splitter 1234. Notably, when the RF switch is open, power passes between the terminals 1215 and 1216 via the filter(s) and or diplexer(s) 1272. Splitter outputs 1242 provide RF signals to subscriber connections.

When the cover 1202 is separated from the housing 1104, the RF-only switch is closed. When the RF-only switch is closed, RF-only signals pass through the switch. Notably, when the RF switch is closed, power passes between the terminals 1215 and 1216 via the filter(s) and or diplexer(s) 1272. Here, RF signals are not available at the splitter outputs 1242.

Figures 13D, 13E:
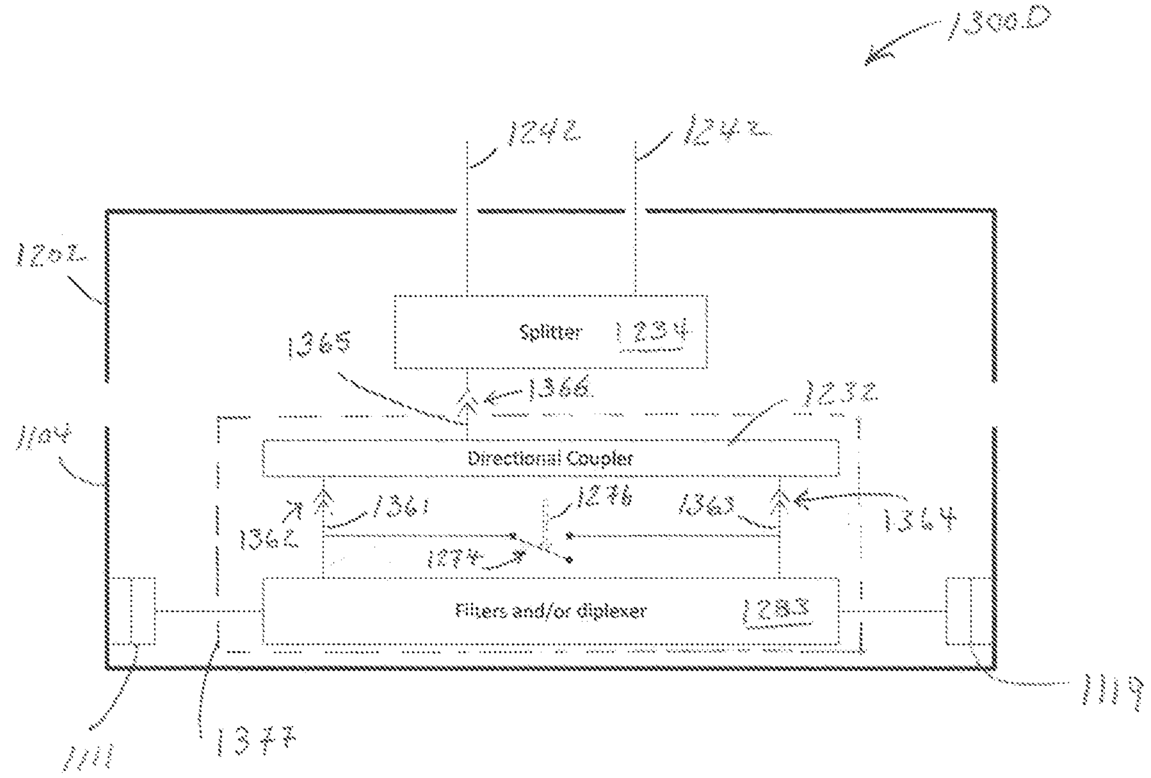

FIG. 13D shows a schematic of the uninterruptable tap with a tap housing 1104 and tap cover 1202 for enclosing tap circuitry. Associated with or within the housing are housing circuits 1377 including a directional coupler, a continuous power passing device, element or module ("device") 1283, and an RF-only switch 1274 which may be operated by an actuator 1276. The directional coupler may be replaced by suitable device(s) which provide similar functions such as coupling power flowing in one direction.

The continuous power passing device 1283 interconnects an upstream coaxial connection 1111 with a downstream coaxial connection 1119. Continuous power passing may be accomplished using any suitable circuit such as a bridge 335 or one or more of circuits including filter(s) and/or diplexer(s).

Associated with or within the cover, a splitter 1234 interconnects with subscriber ports 1242. The splitter may be replaced by a suitable device(s) which provides similar functions such as splitting a signal.

Interconnections 1361, 1363 may include respective separable connectors 1362, 1364, the interconnections between the directional coupler 1232 and the continuous power passing device 1283. Between these interconnections is the RF-only switch which may be operated by an actuator 1276.

An interconnection 1365 may include separable connector 1366, the interconnection transporting signals between the directional coupler 1232 and the splitter 1234.

FIG. 13E shows a switch table 1300E. The RF-only switch may be operated by movement of one tap component relative to another tap component. For example, when a) the directional coupler 1232 is plugged in or b) the housing 1104 and cover 1202 are mated, the switch actuator 1276 may operate to open the RF-only switch such that the directional coupler and splitter receive the RF signal for servicing the subscriber ports 1242. The RF-only switch may be any suitable switch, for example any suitable RF-only switch such as one selected from the switches described herein.

For example, when a) the directional coupler is not plugged in or b) the housing 1104 and cover 1202 are separated, the switch actuator 1276 may operate to close the RF-only switch such that the two signal lines 1361 and 1363 are interconnected.

Figure 14A:
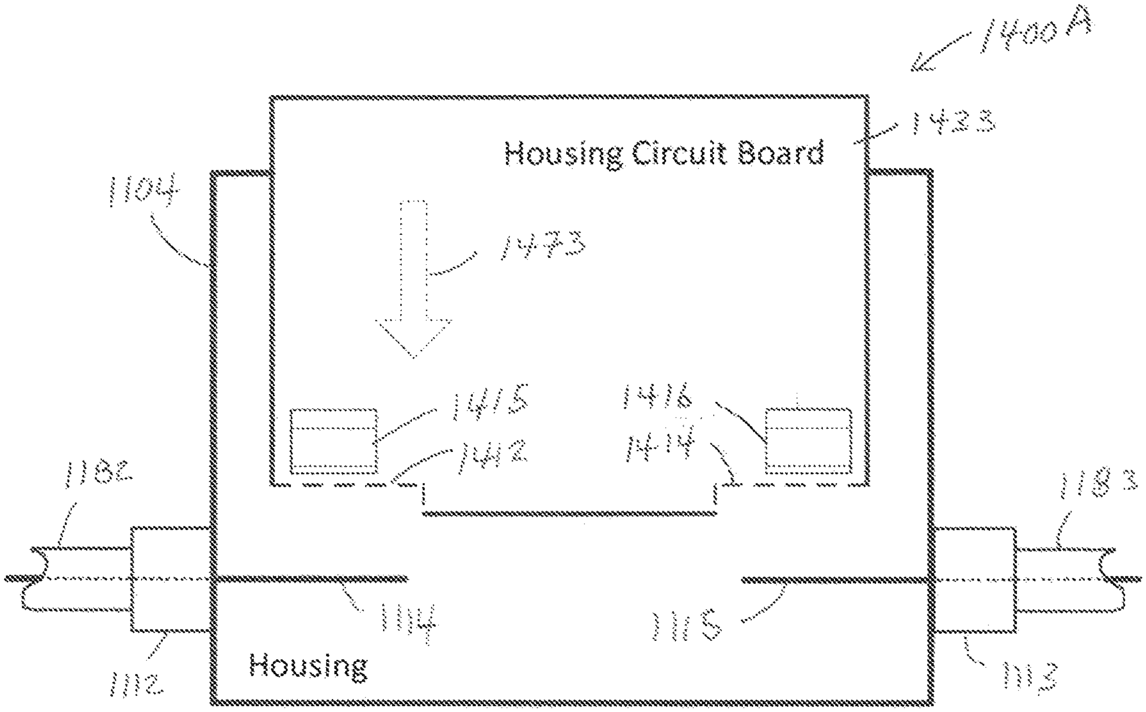
FIGS. 14A-B show housing circuit board insertion in a tap housing with opposed hardline or coaxial cable connections in accordance with embodiments of the present invention.
Figure 14B:
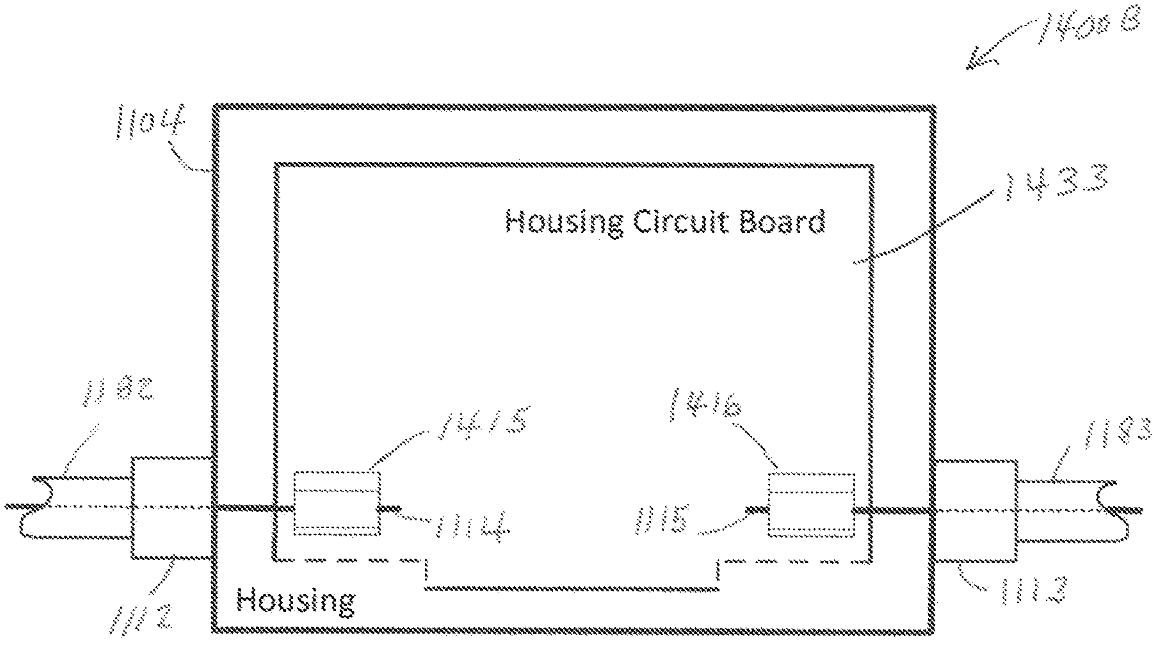

FIGS. 14A-B show housing circuit board insertion when housing connections 1112, 1113 to coaxial conductors are opposed 1400A-B. As seen in FIG. 14A, a housing circuit board 1433 is positioned over a housing 1104. Connectors 1415, 1416 on the housing circuit board are for connection with the center conductors or stingers 1114, 1115 of the coaxial cables or hardline coaxial cables 1182, 1183 having opposed connectors 1112, 1113. As indicated by the housing circuit board movement arrow 1473, the housing circuit board is for insertion in the housing.

In some embodiments, the housing circuit board may have cutouts or corner cutouts 1412, 1414 such that the stingers 1114, 1115 may be received without interference by the connectors 1415, 1416.

FIG. 14B shows the housing circuit board 1433 inserted in the housing 1104. Here, the stingers 1114, 1115 are inserted in the connectors 1415, 1416 and the housing circuit board is seated in the housing 1104.

Figure 14C:
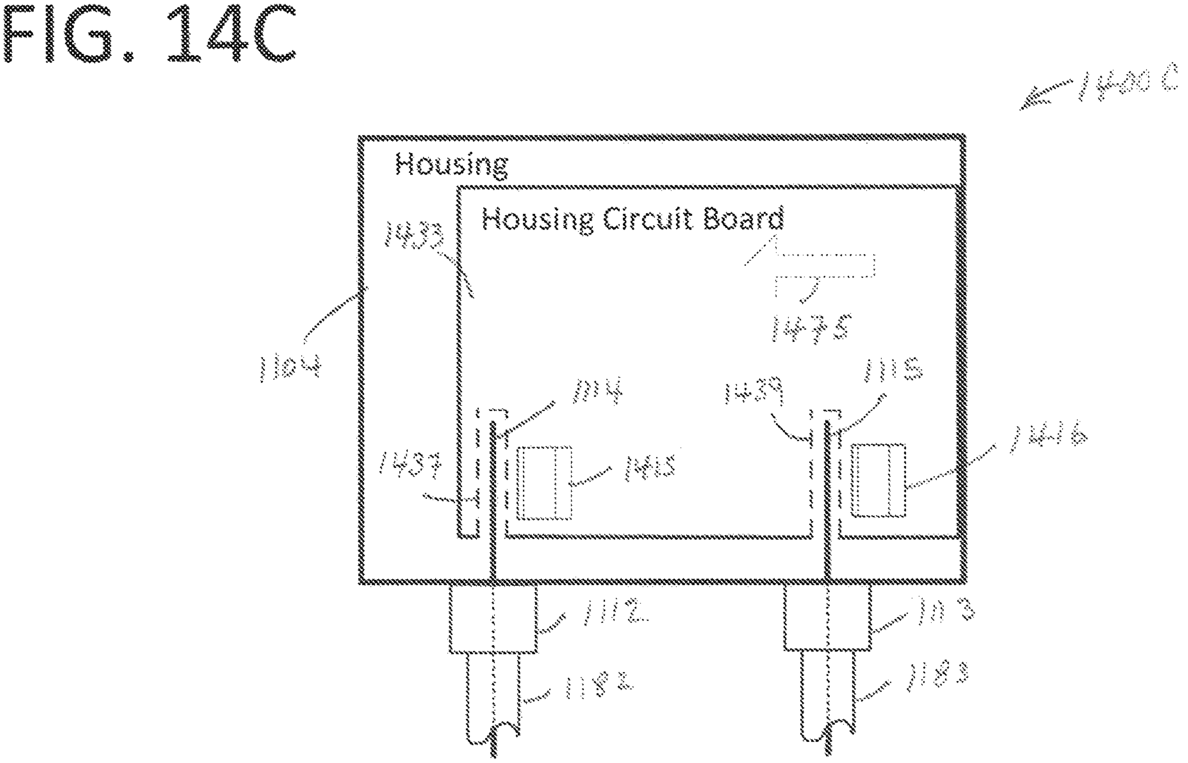
FIGS. 14C-D show housing circuit board insertion in a tap housing with side-by-side hardline or coaxial cable connections in accordance with embodiments of the present invention.
Figure 14D:
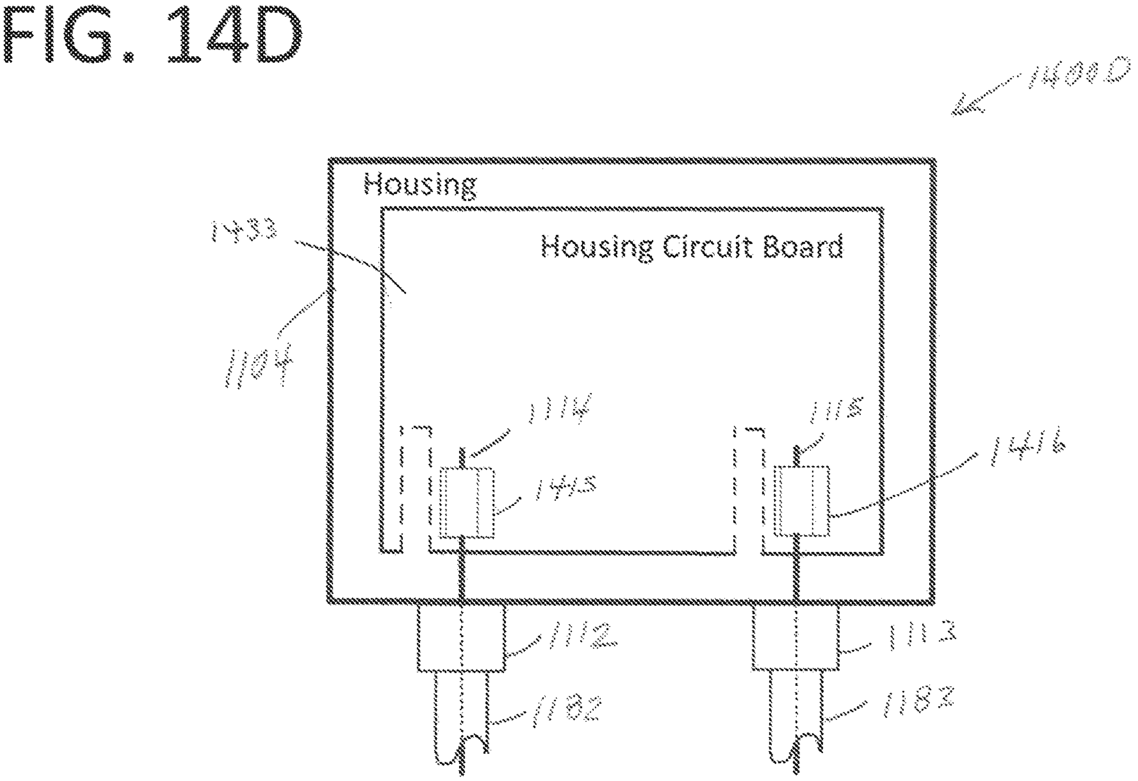

FIGS. 14C-D show housing circuit board insertion when housing connections 1112, 1113 to hardline coaxial circuits are side-by-side 1400C-D. As seen in FIG. 14C, a housing circuit board 1433 is positioned over a housing 1104. Connectors 1415, 1416 on the housing circuit board are for connection with the center conductors or stingers 1114, 1115 of the coaxial cables or hardline coaxial cables 1182, 1183 having side-by-side connectors 1112, 1113. As indicated by the housing circuit board movement arrow 1475, the housing circuit board is for insertion in the housing.

In some embodiments, the housing circuit board may have cutouts or corner cutouts 1437, 1439 such that the stingers 1114, 1115 may be received without interference by the connectors 1415, 1416.

FIG. 14D shows the housing circuit board 1433 inserted in the housing 1104. Here, the stingers 1114, 1115 are inserted in the connectors 1415, 1416 and the housing circuit board is seated in the housing 1104.

In order to achieve high frequency operation, special consideration may be given to the design of connectors 1415, 1416 for contact with stingers 1114, 1115. In general, contacts capable of operation at high frequencies are desirable. For example spring type connectors may be used. For example, contact lengths of 2, 3, 4, 5 . . . 20 times the stinger diameter may be used and a somewhat coaxial contact area may be used.

Figure 14E:
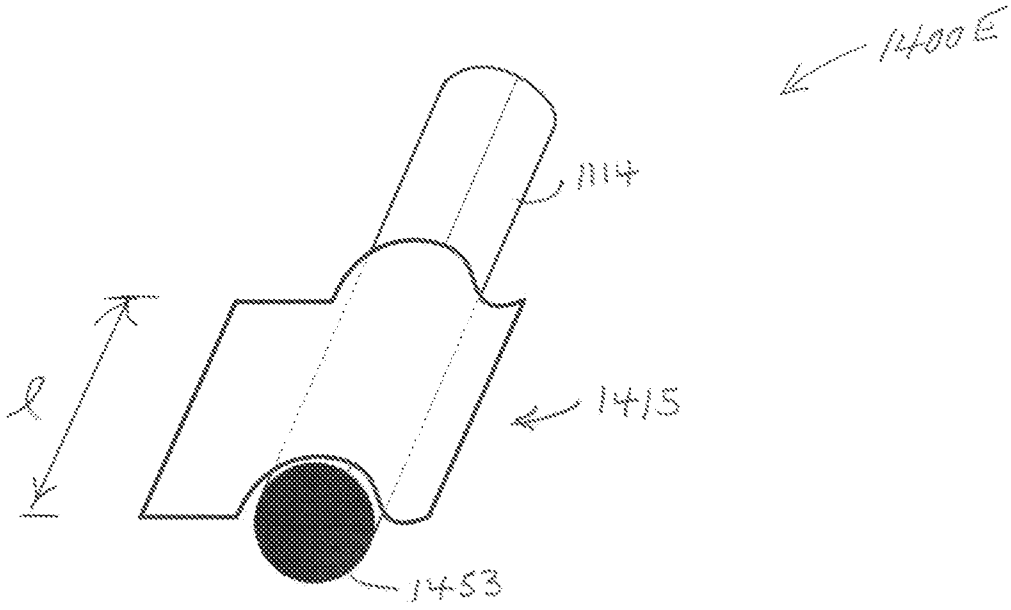
FIGS. 14E-F show a stinger connections in accordance with embodiments of the present invention.
Figure 14F:
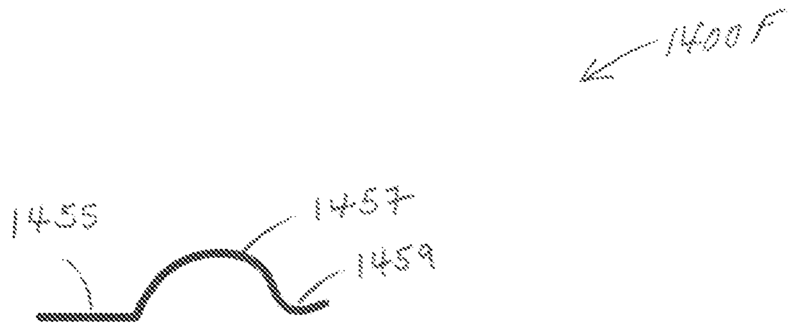

FIGS. 14E-F show a stinger connector using a high frequency contact design 1400E-F. This connector may also be required to pass a current of approximately 15 amps. In FIG. 14E, a stinger 1114 is shown with a connector 1415 of length "t" wrapped around a portion of the stinger circumference 1453. In some embodiments, the connector wrap around the stinger may vary from 90 degrees to 300 degrees of stinger circumference. Contact length and/or coaxial wrap may be selected to improve the connector's hold on the stinger and/or to improve the high frequency performance of the connector.

In FIG. 14F, a profile view of connector 1415 is shown. Moving from left to right, the connector includes a platform 1455, a wrap 1457, and a lip 1459. The platform is for being coupled to the housing circuit board 1433, the wrap is for encircling the stinger 1114, and the lip 1459 provides a movable portion that may be lifted to capture the stinger.

FIGS. 15A-J show various connections to coaxial cable central conductors 1500A-J. In various embodiments, the terminal portion of the center conductor is for connection with a seizing pin. In various embodiments the terminal portion of the center conductor is received into a pin that is for connection with a seizing pin. In some embodiments, these are KS or hardline central conductors. Terminal portions of hardline center conductors or pins thereon may be referred to as stingers where the stinger is for connection with a seizing pin.

Figure 15A:
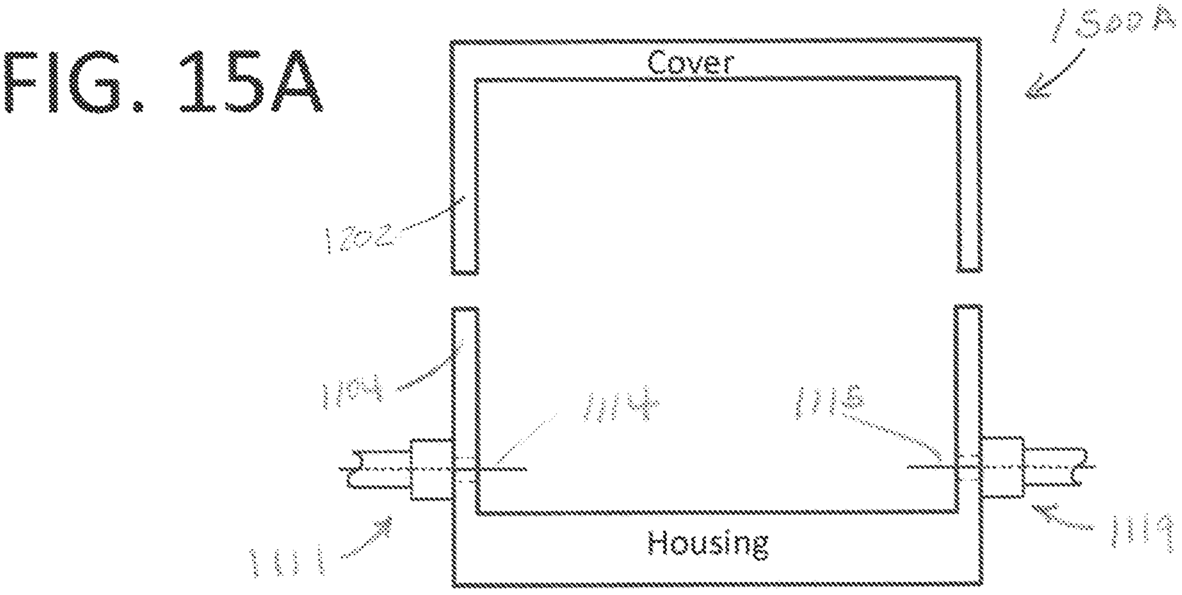
FIGS. 15A-L show seizing pins for connection with coaxial cable center conductors in accordance with embodiments of the present invention.
Figure 15B:
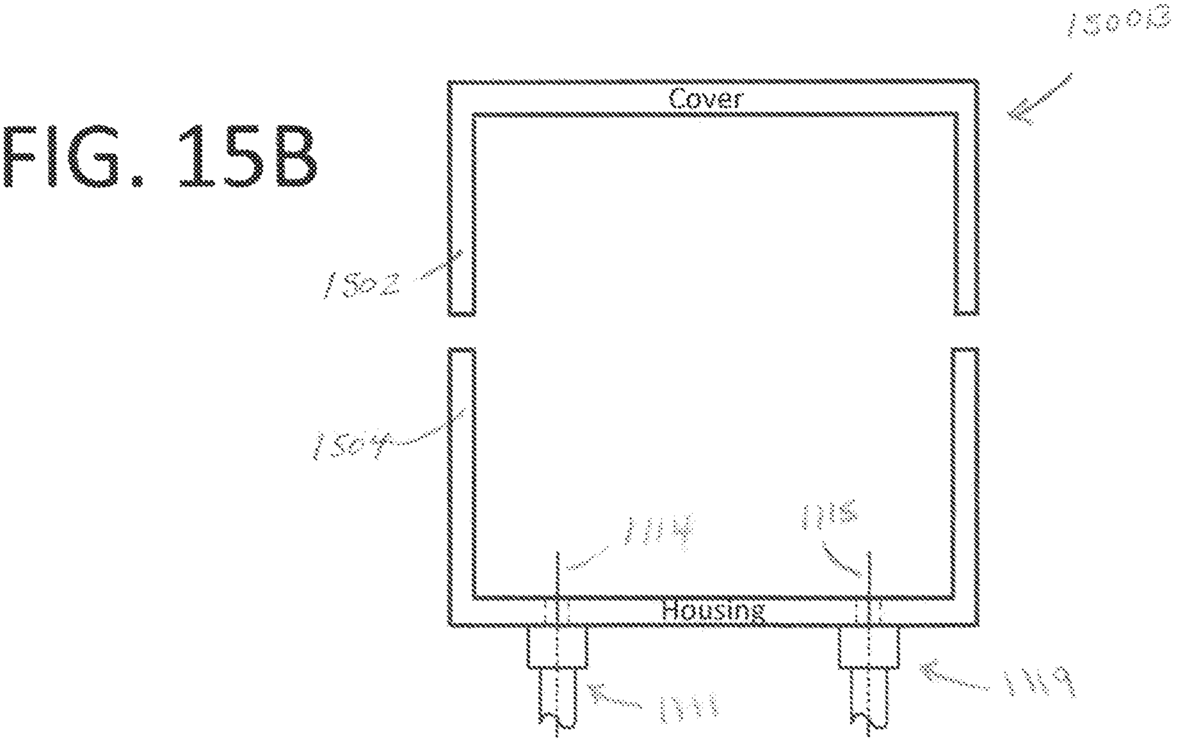

FIGS. 15A-B show tap housings with different external configurations. In FIG. 15A a tap includes a cover 1202 and a housing 1104. Upstream 1111 and downstream 1119 connectors connect to the housing 1104 such that the connectors are opposed.

In FIG. 15B a tap includes a cover 1502 and a housing 1504. Upstream 1111 and downstream 1119 connectors connect to the housing 1104 such that the connectors are side-by-side.

Each of the upstream and downstream connectors connect with a mating connection such as a mating housing connection. Circuitry within the tap may or may not be affected by this arrangement of upstream and downstream connectors. Of interest here is connections within the housing to the coaxial cable center conductors 1114, 1115 which may in cases be better suited to a particular seizing pin (i.e., center conductor connector) design and arrangement. As mentioned above, high tap operation frequencies such as 1.8 GHz and above may require particular seizing pin designs and arrangements.

FIGS. 15C-J show various seizing catches for seizing the upstream and/or downstream coaxial cable center conductors. These seizing catches generally extend from a circuit board such as a housing circuit board 1233. These seizing catches may utilize a spring or spring-like action to seize a conductor such as a coaxial center conductor or stinger. To illustrate seizing catch design and arrangement, the figures show a single seizing catch, extending from a circuit board such as a housing circuit board 1233, which attaches to a coaxial cable center conductor 1114.

In some embodiments, positioning the housing circuit board 1233 in a housing with upstream and downstream coaxial cable center conductors protruding into the housing is made difficult by limited space within the housing. Where movement of the circuit board within the housing is constrained, a particular seizing catch design and/or arrangement may be required.

Figure 15C:
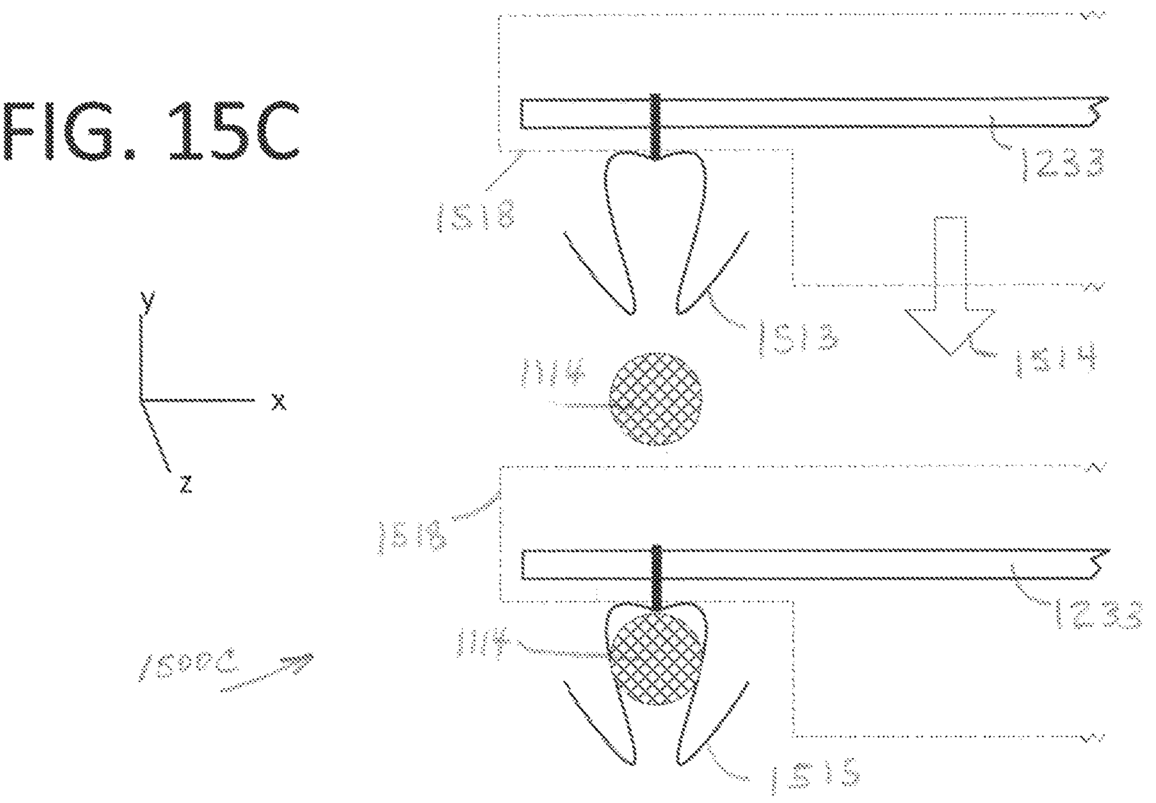
Figure 15D:
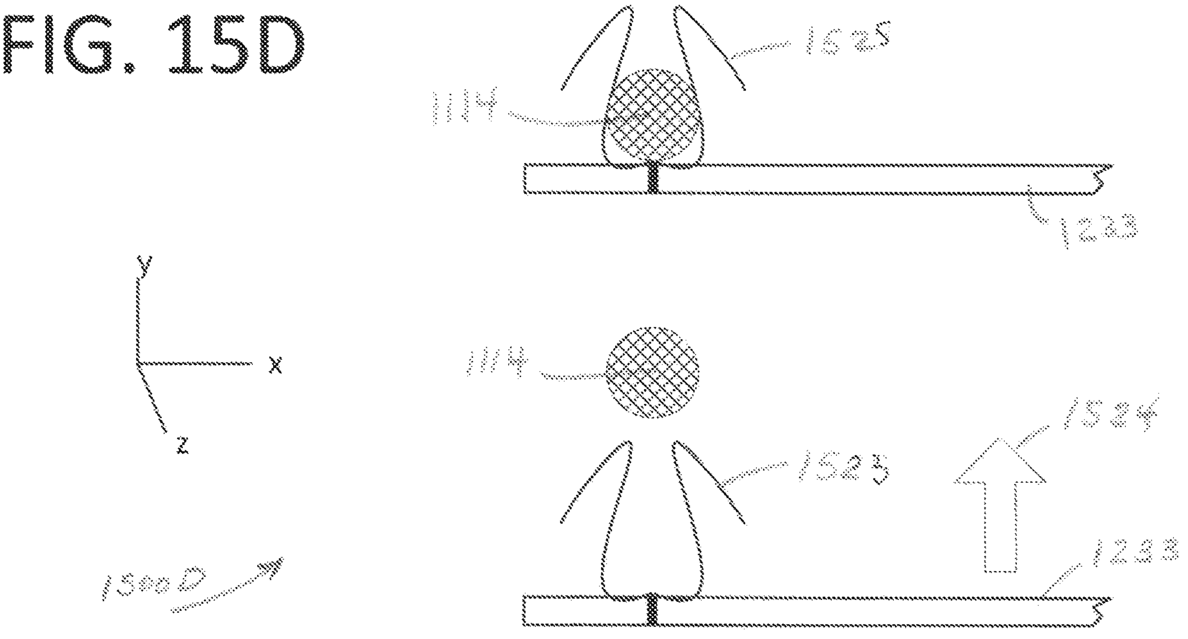

FIGS. 15C-D show a surface mounted saddle seizing catch 1500C-D.

FIG. 15C shows a circuit board 1233 with a bottom mounted seizing catch in the form of a saddle 1513 positioned above a coaxial cable center conductor 1114. The figure also shows movement of the board in a downward or y direction 1514 resulting in the seizing catch grabbing the center conductor 1515. Uses of this seizing catch design and arrangement may be indicated where it is possible to drop a housing circuit board, such as circuit board 1233, into the housing. In some embodiments a circuit board cover or wrap such as a plastic or a metallic cover 1518 is utilized to guard the seizing catch, guide the center conductor 1114, electromagnetically shield included circuits and components, and/or protect the included circuits and components from physical damage.

FIG. 15D is similar to FIG. 15C but here the saddle is inverted 1523 and atop the circuit board 1233 with engagement of the center conductor 1525 occurring when the board is moved up in the y direction 1524. A circuit board cover or wrap may be included.

Figure 15E:
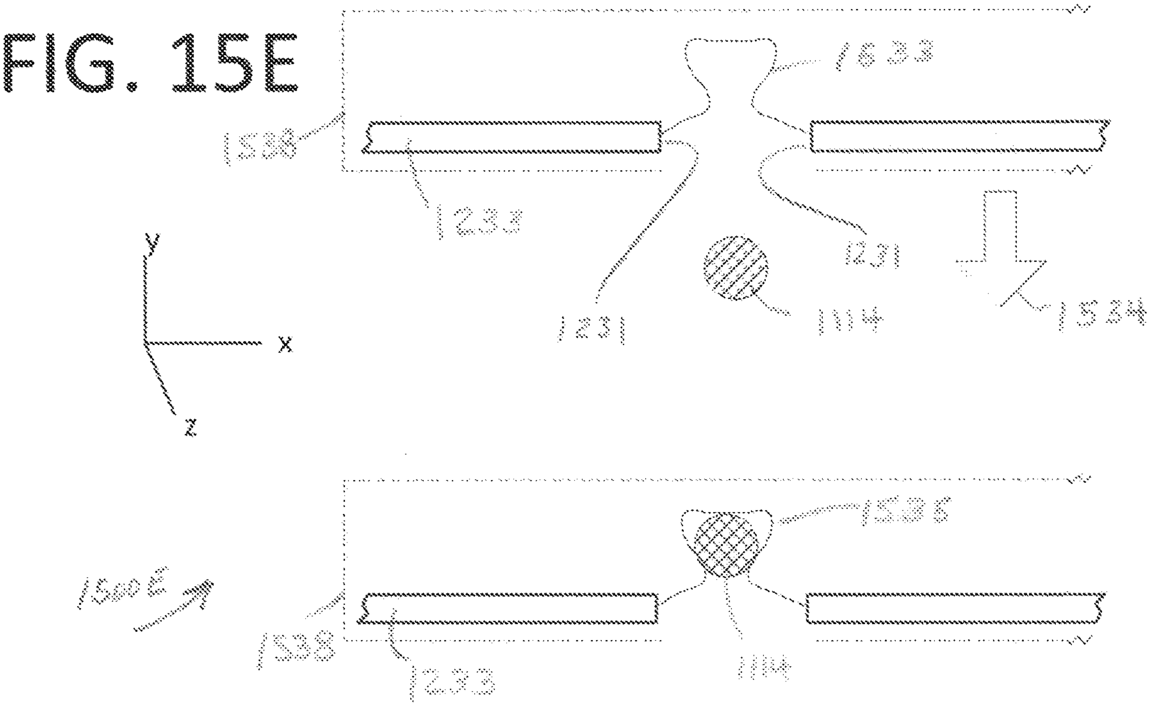
Figure 15F:
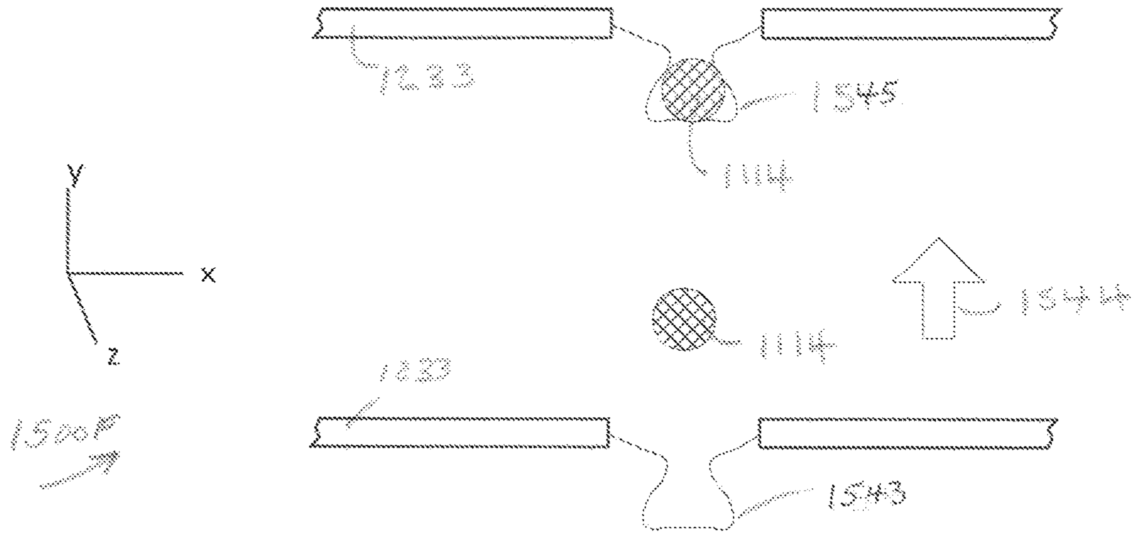

FIGS. 15E-F show an interior mounted saddle seizing catch 1500E-F. Here, the seizing catch is sprung or located between opposing edges 1231 of a circuit board.

FIG. 15E shows a circuit board 1233 with a top mounted interior seizing catch in the form of a saddle 1533 positioned above a coaxial cable center conductor 1114. The figure also shows movement of the board in a downward or y direction 1534 resulting in the seizing catch grabbing the center conductor 1535. Uses of this seizing catch design and arrangement may be indicated where it is possible to drop a housing circuit board, such as circuit board 1233, into the housing. As seen, a circuit board cover or wrap 1538 may be included.

FIG. 15F is similar to FIG. 15E but here the saddle is inverted 1543 and beneath the circuit board 1233 with engagement of the center conductor 1545 occurring when the board is moved up in the y direction 1544. A circuit board cover or wrap may be included.

Figure 15G:
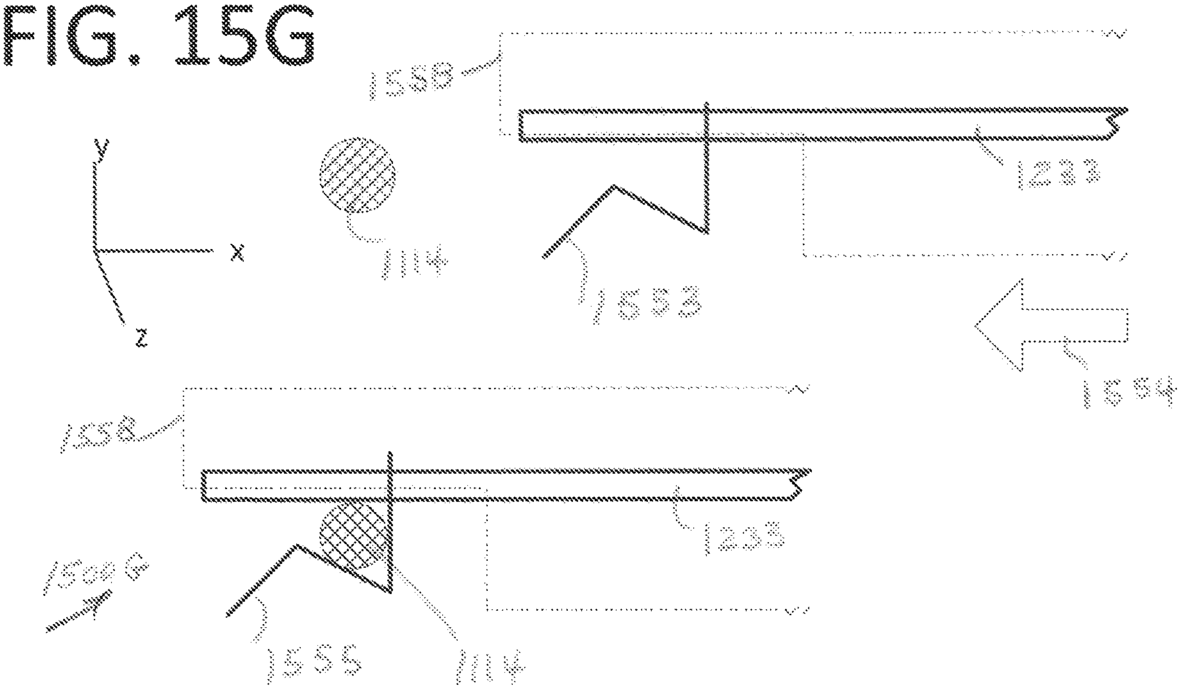
Figure 15H:
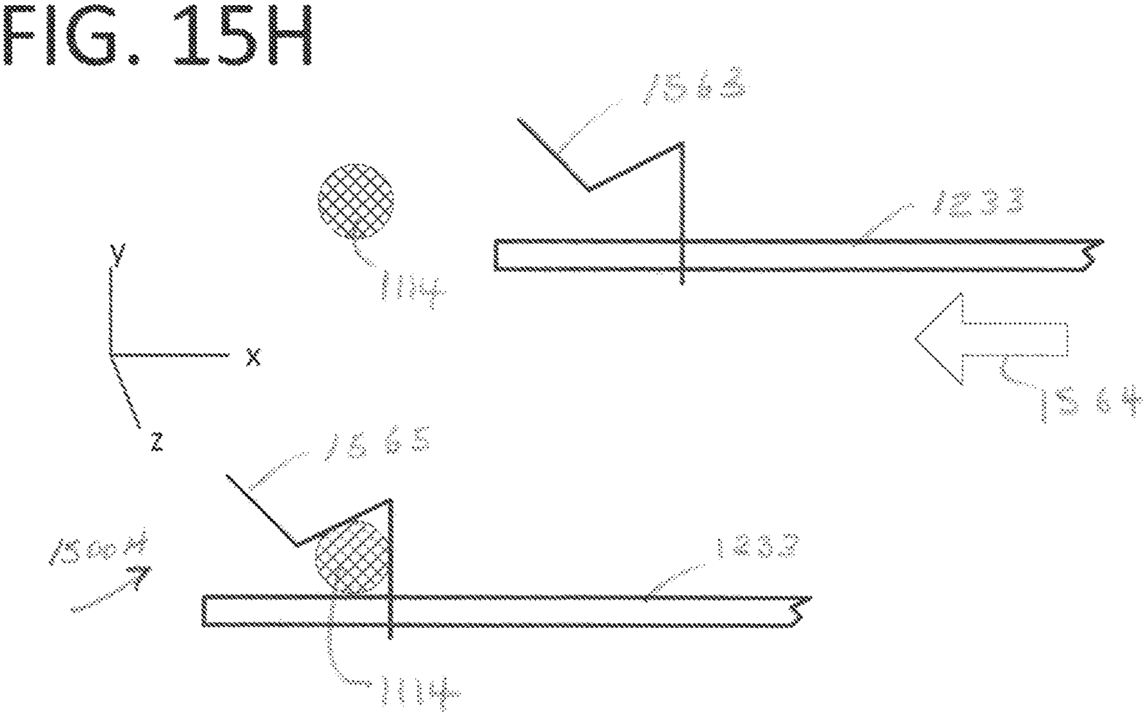

FIGS. 15G-H show an angular clip seizing catch 1500G-H.

FIG. 15G shows a circuit board 1233 with a bottom mounted angular clip seizing catch 1553 positioned to the side of a coaxial cable center conductor 1114. The figure also shows movement of the board leftward or sideways in the x direction 1554 resulting in the seizing catch grabbing the center conductor 1555. Uses of this seizing catch design and arrangement may be indicated where it is possible to move the circuit board within the housing and over the center conductor such that the bottom mounted seizing catch engages the center conductor. As seen, a circuit board cover or wrap 1558 may be included.

FIG. 15H is similar to FIG. 15G but here the angular clip 1563 is atop the circuit board 1233 with engagement of the center conductor 1565 occurring when the board is moved leftward in the x direction 1564. A circuit board cover or wrap may be included.

Figure 15I:
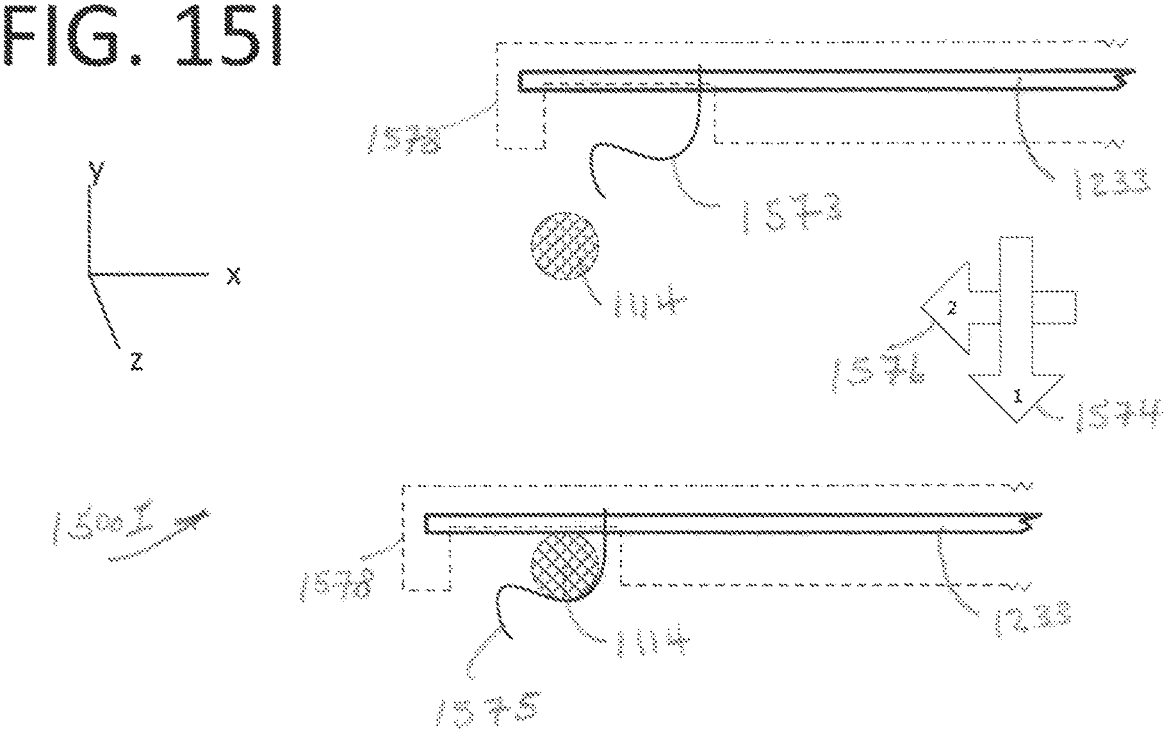
Figure 15J:
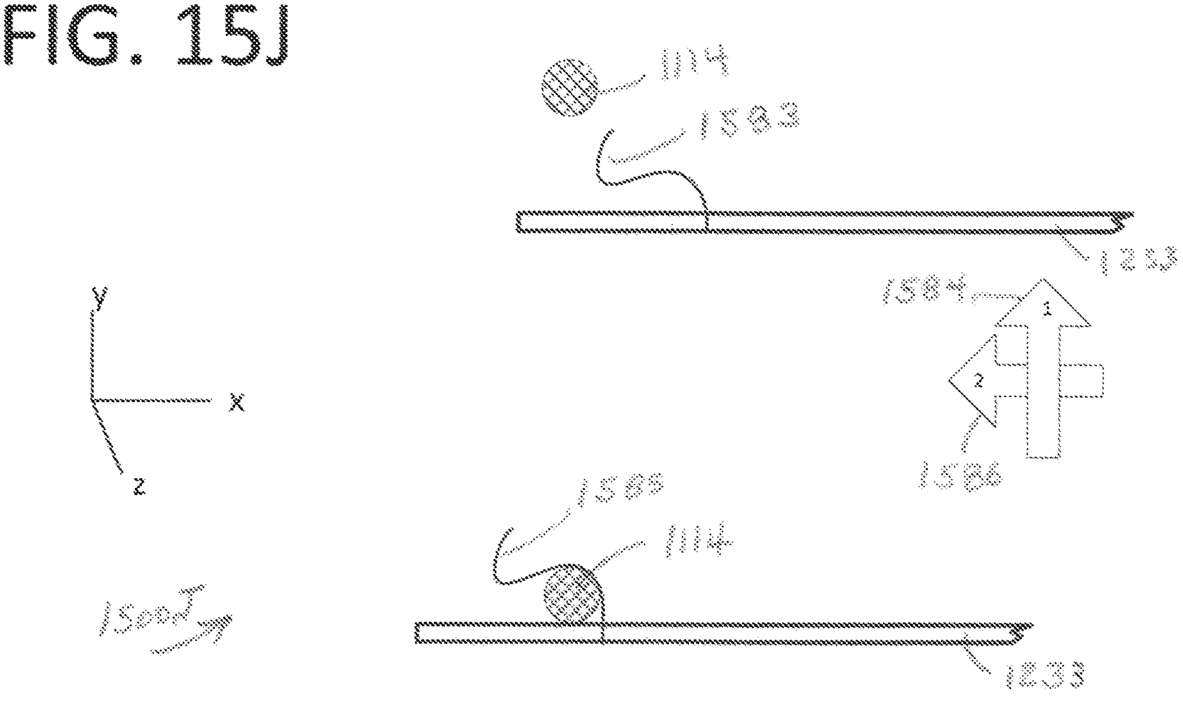

FIGS. 15I-J show a rounded clip seizing catch 1500I-J.

FIG. 15I shows a circuit board 1233 with a bottom mounted angular clip seizing catch 1573 positioned to the side of a coaxial cable center conductor 1114. The figure also shows movement of the board down 1574 in the y direction and to the left 1576 in the x direction resulting in the seizing catch grabbing the center conductor 1575. Uses of this seizing catch design and arrangement may be indicated where it is possible to move the circuit board within the housing and over the center conductor such that the bottom mounted seizing catch engages the center conductor. As seen, a circuit board cover or wrap 1578 may be included.

FIG. 15J is similar to FIG. 15I but here the rounded clip 1583 is atop the circuit board 1233 with engagement of the center conductor 1585 occurring when the board is moved up 1584 in the y direction and to the left 1586 in the x direction. A circuit board cover or wrap may be included.

Figure 15K:
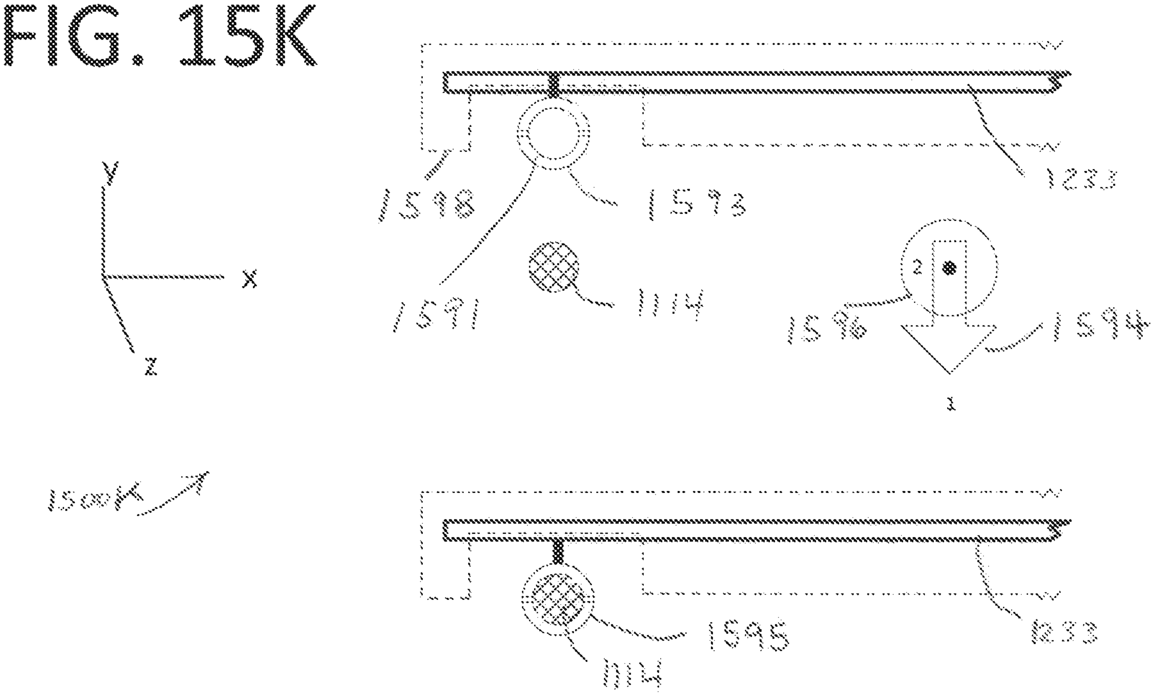
Figure 15L:
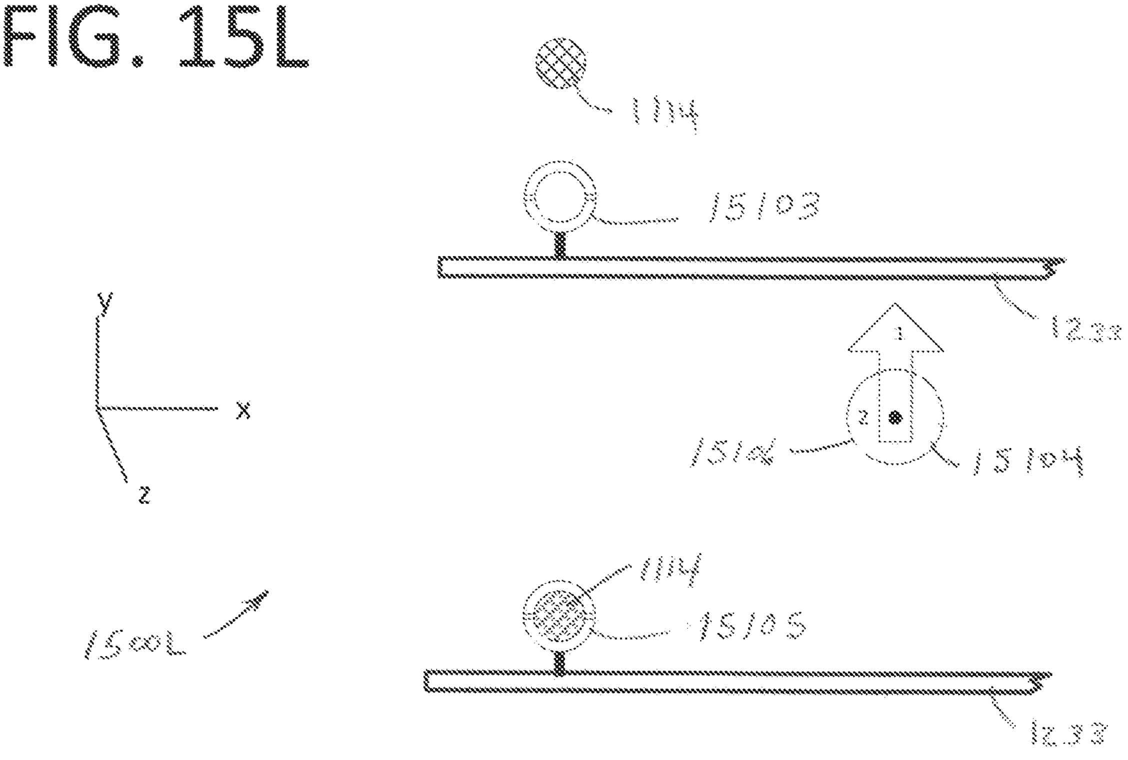

FIGS. 15K-L show a tubular seizing catch 1500K-L. The mouth of the tubular seizing catch 1591 may be slotted to provide a spring like grasp of a center conductor.

FIG. 15K shows a circuit board 1233 with a bottom mounted tubular clip seizing catch 1593 positioned above and opposite a coaxial cable center conductor 1114. The figure also shows movement of the board down 1594 in the y direction and toward the center conductor 1596 in the z direction resulting in the seizing catch grabbing the center conductor 1595. Uses of this seizing catch design and arrangement may be indicated where the housing center conductors are side by side. As seen, a circuit board cover or wrap 1598 may be included.

FIG. 15L is similar to FIG. 15K but here the tubular seizing catch 15103 is atop the circuit board 1233 with engagement of the center conductor 15105 occurring when the board is moved up 15104 in the y direction and toward the center conductor 15106 in the z direction resulting in the seizing catch grabbing the center conductor 1114. A circuit board cover or wrap may be included.

It will be apparent to those skilled in the art having the benefit of the teachings presented in the foregoing descriptions and the associated drawings that modifications, combinations, sub-combinations, and variations can be made without departing from the spirit or scope of this disclosure. Likewise, the various examples described may be used individually or in combination with other examples. Those skilled in the art will appreciate various combinations of examples not specifically described or illustrated herein that are still within the scope of this disclosure. In this respect, it is to be understood that the disclosure is not limited to the specific examples set forth and the examples of the disclosure are intended to be illustrative, not limiting.

As used in this specification and the appended claims, the singular forms "a", "an" and "the" include plural referents, unless the context clearly dictates otherwise. Similarly, the adjective "another," when used to introduce an element, is intended to mean one or more elements. The terms "comprising," "including," "having" and similar terms are intended to be inclusive such that there may be additional elements other than the listed elements. The term coupled may refer to a direct connection or to an indirect connection as in A coupled to C or A coupled to C via B.

Additionally, where a method described above or a method claim below does not explicitly require an order to be followed by its steps or an order is otherwise not required based on the description or claim language, it is not intended that any particular order be inferred. Likewise, where a method claim below does not explicitly recite a step mentioned in the description above, it should not be assumed that the step is required by the claim.

It is noted that the description and claims may use geometric or relational terms indicating direction, rotation, orientation, proximity and the like. These terms are not intended to limit the disclosure and, in general, are used for convenience to facilitate the description based on the examples shown in the figures. In addition, the geometric or relational terms may not be exact. For instance, walls may not be exactly perpendicular or parallel to one another because of, for example, roughness of surfaces, tolerances allowed in manufacturing, etc., but may still be considered to be perpendicular or parallel.

What is claimed is:

1. A refurbished tap installation for use in a cable television distribution system comprising:

a pre-existing tap installed between pre-existing upstream and downstream coaxial cables; and, pre-existing coaxial cable center conductors or pre-existing pins connected with the pre-existing coaxial cable center conductors protruding into the tap;

wherein refurbishment includes a) replacing an RF and power switch with an RF-only switch and b) addition of a non-switched circuit for passing power continuously between the upstream and downstream coaxial cables.

2. The tap of claim 1 wherein refurbishment includes addition of filters and/or a diplexer to a circuit board that includes spring-action seizing catches that interconnect with the upstream and downstream coaxial cables.

3. The tap of claim 1 wherein refurbishment includes replacing a circuit board that lacks a directional coupler with a multi-function circuit board that includes a directional coupler.

4. The tap of claim 1 wherein a circuit board includes spring-action seizing catches that interconnect with the upstream and downstream coaxial cables.

5. The tap of claim 4 wherein the seizing catches are designed for operation at frequencies including 1.8 GHz and for passing currents including a current of 15 amperes.

6. The tap of claim 5 wherein the seizing catches are saddle shaped for wrapping around opposed sides of coaxial cable center conductors.

7. The tap of claim 6 wherein the seizing catches extends from a bottom of the circuit board.

8. The tap of claim 6 wherein the seizing catches extends from a top of the circuit board.

9. The tap of claim 5 wherein the seizing catches are formed as angular clips for capturing a coaxial cable center conductors between the clip and the circuit board.

10. The tap of claim 9 wherein one of the seizing catches grabs the center conductor when the circuit board is moved sideways.

11. The tap of claim 5 wherein the seizing catches are formed as tubes for grabbing inserted coaxial cable center conductors.

12. A tap for use in a cable television distribution system comprising:

a housing and a cover;

circuits within the cover including a directional coupler and a splitter for serving subscribers;

circuits within the housing including a non-switched continuous power passing device, and a switch; and, RF circuits between the housing circuits and the cover circuits, the RF circuits for transport of RF signals.

13. A tap for use in a cable television distribution system comprising:

a housing and a cover;

circuits within the cover including a directional coupler and a splitter for serving subscribers;

circuits within the housing including a non-switched continuous power passing device, and a switch; and, RF circuits between the housing circuits and the cover circuits, the RF circuits for transport of RF signals;

wherein the switch is an RF-only switch.

14. A tap for use in a cable television distribution system comprising:

a housing and a cover;

circuits within the cover including a splitter for serving subscribers;

circuits within the housing including a directional coupler, a continuous power passing device, and a switch; and, a single RF circuit between the housing circuits and the cover circuits, the single RF circuit for bidirectional transport of RF signals.

15. The tap of claim 14 wherein the switch is an RF-only switch.

* * * * *